(12) United States Patent
Kawabata et al.

(10) Patent No.: US 11,302,964 B2
(45) Date of Patent: Apr. 12, 2022

(54) ELECTROLYTIC SOLUTION FOR NONAQUEOUS ELECTROLYTIC SOLUTION BATTERY, AND NONAQUEOUS ELECTROLYTIC SOLUTION BATTERY USING SAME

(71) Applicant: Central Glass Company, Limited, Ube (JP)

(72) Inventors: Wataru Kawabata, Ube (JP); Mikihiro Takahashi, Ube (JP); Takayoshi Morinaka, Ube (JP); Makoto Kubo, Ube (JP)

(73) Assignee: Central Glass Company, Limited, Ube (JP)

( * ) Notice: Subject to any disclaimer, the term of this patent is extended or adjusted under 35 U.S.C. 154(b) by 560 days.

(21) Appl. No.: 16/076,181

(22) PCT Filed: Feb. 3, 2017

(86) PCT No.: PCT/JP2017/003964
§ 371 (c)(1),
(2) Date: Aug. 7, 2018

(87) PCT Pub. No.: WO2017/138452
PCT Pub. Date: Aug. 17, 2017

(65) Prior Publication Data
US 2021/0020992 A1    Jan. 21, 2021

(30) Foreign Application Priority Data

Feb. 8, 2016    (JP) .............................. JP2016-021885

(51) Int. Cl.
| | | |
|---|---|---|
| H01M 10/0569 | (2010.01) | |
| H01M 10/0567 | (2010.01) | |
| H01M 10/0568 | (2010.01) | |
| H01M 10/0525 | (2010.01) | |

(52) U.S. Cl.
CPC ... *H01M 10/0569* (2013.01); *H01M 10/0525* (2013.01); *H01M 10/0567* (2013.01); *H01M 10/0568* (2013.01); *H01M 2300/0037* (2013.01)

(58) Field of Classification Search
CPC ......... H01M 10/0569; H01M 10/0567; H01M 10/0568; H01M 10/0525; H01M 2300/0037
See application file for complete search history.

(56) References Cited

U.S. PATENT DOCUMENTS

| | | | |
|---|---|---|---|
| 6,033,809 | A | 3/2000 | Hamamoto et al. |
| 2004/0007688 | A1 | 1/2004 | Awano et al. |
| 2004/0043300 | A1 | 3/2004 | Utsugi et al. |
| 2009/0226808 | A1 | 9/2009 | Hiwara et al. |
| 2014/0045076 | A1 | 2/2014 | Shishikura et al. |
| 2014/0272556 | A1 | 9/2014 | Mio et al. |
| 2015/0270575 | A1 | 9/2015 | Nishie et al. |
| 2016/0133991 | A1* | 5/2016 | Kawasoe ............ H01M 10/058 429/188 |
| 2017/0204124 | A1 | 7/2017 | Takahashi et al. |

FOREIGN PATENT DOCUMENTS

| | | |
|---|---|---|
| CN | 103367804 A | 10/2013 |
| CN | 103875117 A | 6/2014 |
| CN | 104685697 A | 6/2015 |
| CN | 105206874 A | 12/2015 |
| EP | 1 383 187 A2 | 1/2004 |
| ER | 3 416 229 A | 12/2018 |
| JP | 10-139784 A | 5/1998 |
| JP | 2000-3724 A | 1/2000 |
| JP | 2002-329528 A | 11/2002 |
| JP | 2004-39510 A | 2/2004 |
| JP | 2004-87459 A | 3/2004 |
| JP | 2004-171981 A | 6/2004 |
| JP | 2004-185931 A | 7/2004 |

(Continued)

OTHER PUBLICATIONS

Communication pursuant to Rule 114(2) EPC issued in counterpart European Application No. 17750175.6 dated Aug. 9, 2019 (28 pages).
Japanese-language Submission of Publications issued in counterpart Japanese Application No. 2017-566915 dated Jul. 22, 2019 with partial English translation (22 pages).
Extended European Search Report issued in counterpart European Application No. 17750175.6 dated Feb. 19, 2019 (nine (9) pages).
International Search Report (PCT/ISA/210) issued in PCT Application No. PCT/JP2017/003964 dated Apr. 18, 2017 with English translation (five (5) pages).
Japanese-language Written Opinion (PCT/ISA/237) issued in PCT Application No. PCT/JP2017/003964 dated Apr. 18, 2017 (four (4) pages).

(Continued)

*Primary Examiner* — Osei K Amponsah
(74) *Attorney, Agent, or Firm* — Crowell & Moring LLP

(57) ABSTRACT

An electrolytic solution for a nonaqueous electrolyte battery according to the present invention includes: (I) at least one kind of silane compound represented by the following general formula (1); (II) at least one kind selected from the group consisting of a cyclic sulfonic acid compound and a cyclic sulfuric ester compound; (III) a nonaqueous organic solvent; and (IV) a solute. The nonaqueous electrolyte battery with this electrolytic solution achieves a good balance between improvement of high-temperature storage characteristics under high-temperature conditions of 70° C. or higher and reduction of gas generation during high-temperature storage.

$$\mathrm{Si}(R^1)_x(R^2)_{4-x} \qquad (1)$$

In the general formula (1), $R^1$ is each independently a carbon-carbon unsaturated bond-containing group; $R^2$ is each independently selected from a fluorine group and a $C_1$-$C_{10}$ linear or $C_3$-$C_{10}$ branched alkyl group which may have a fluorine atom and/or an oxygen atom; and x is an integer of 2 to 4.

9 Claims, No Drawings

(56) References Cited

FOREIGN PATENT DOCUMENTS

| JP | 2004-281368 A | | 10/2004 | | |
|---|---|---|---|---|---|
| JP | 2007-149656 A | | 6/2007 | | |
| JP | 2007-180015 A | * | 7/2007 | ............ | H01M 10/40 |
| JP | 2010-92748 A | | 4/2010 | | |
| JP | 2010-219011 A | | 9/2010 | | |
| JP | 2011-77029 A | | 4/2011 | | |
| JP | 2014-170689 A | | 9/2014 | | |
| KR | 10-2014-0067109 | | 6/2014 | | |
| KR | 10-2017-0021335 | | 2/2017 | | |
| WO | WO 2007/043624 A1 | | 4/2007 | | |
| WO | WO 2013/191475 A1 | | 12/2013 | | |
| WO | WO 2014/054197 | | 4/2014 | | |
| WO | WO 2014/196177 A1 | | 12/2014 | | |
| WO | WO 2016/002774 A1 | | 1/2016 | | |

OTHER PUBLICATIONS

Rosenberg et al., "Preparation of Some Vinylsilanes with Vinylmagnesium Chloride", Journal of Organic Chemistry, 1957, pp. 1200-1202, vol. 22.
Sinek I., "Laboratórna Priprava Tetravinylsilánu", Chemicke Zvesti, 1964, pp. 21-27, vol. 18.
Chinese-language Office Action issued in Chinese Application No. 201780010142.8 dated Sep. 28, 2020 with English translation (26 pages).

* cited by examiner

ELECTROLYTIC SOLUTION FOR NONAQUEOUS ELECTROLYTIC SOLUTION BATTERY, AND NONAQUEOUS ELECTROLYTIC SOLUTION BATTERY USING SAME

FIELD OF THE INVENTION

The present invention relates to an electrolytic solution for a nonaqueous electrolyte battery, which contains a specific silane compound and at least one kind selected from a cyclic sulfonic acid compound and a cyclic sulfuric ester compound, and to a nonaqueous electrolyte battery using the electrolytic solution.

Background Art

In recent years, there has been a rapidly increasing demand for batteries having a high capacity, high output and high energy density, not only for use in power storage systems for small, high-energy-density applications such as information processing and communication devices typified by personal computers, video cameras, digital cameras, mobile phones and smartphones, but also for use in electric vehicles, hybrid vehicles and auxiliary power sources of fuel cell vehicles. There has also been an increasing demand for batteries usable over a time in power storage systems for large power applications such as power storage facilities. Nonaqueous electrolyte batteries including lithium ion batteries, lithium batteries and lithium ion condensers are being intensively developed as candidates for these power storage systems.

Principally, a lithium secondary battery includes a positive electrode, a nonaqueous electrolytic solution and a negative electrode.

As negative electrode materials for lithium secondary batteries, there are known a lithium metal, a metal compound (e.g. simple metal substance, metal oxide or metal-lithium alloy) or carbon material capable of occluding and releasing lithium, and the like. In particular, lithium secondary batteries using carbon materials such as coke, artificial graphite and natural graphite, each of which is capable of occluding and releasing lithium, are widely put into practical use. It is however reported that a lithium secondary battery using a highly crystallized carbon material such as natural graphite or artificial graphite as a negative electrode material causes a deterioration of cycle characteristics because a nonaqueous solvent in a nonaqueous electrolytic solution is reduced and decomposed on a surface of the negative electrode during charging so that the inherent electrochemical reaction of the battery is inhibited by the thus-generated decomposition product or gas.

It is also known that a lithium secondary battery using a lithium metal or a simple substance or oxide of metal such as silicon, tin etc. as a negative electrode material has a high initial capacity, but shows a decrease of first cycle charge/discharge efficiency with increase of initial irreversible battery capacity and thereby causes a large deterioration of battery characteristics such battery capacity and cycle characteristics because the negative electrode of such metal material is more likely to be reduced and decomposed, than a negative electrode of carbon material, due to the progress of micronization of the negative electrode material during cycle operation.

When lithium ion is included in the negative electrode during a first cycle charge, the negative electrode reacts with the lithium ion or the solvent of the electrolytic solution to form a coating film composed mainly of lithium oxide, lithium carbonate or lithium alkyl carbonate on the surface of the negative electrode. This coating film on the surface of the negative electrode is called a solid electrolyte interface (SEI) and exhibits the properties of suppressing reduction and decomposition of the solvent and preventing a deterioration of battery characteristics. The battery characteristics are thus largely influenced by the properties of the solid electrolyte interface film.

As mentioned above, there has been a problem that it becomes impossible to cause smooth occlusion/release of lithium in/from the negative electrode due to the adverse influence e.g. generation and accumulation of the decomposition product or gas from the nonaqueous solvent, micronization of the negative electrode material or the like. This results in a significant deterioration of battery characteristics such as cycle characteristics.

There are known $LiCoO_2$, $LiMn_2O_4$, $LiNiO_2$, $LiFePO_4$ and the like as positive electrode materials for lithium secondary batteries. It is reported that a lithium secondary batteries using such a positive electrode material causes a deterioration of battery characteristics such as cycle characteristics because, under high-temperature conditions in a charging state, a nonaqueous solvent in a nonaqueous electrolytic solution is locally oxidized and decomposed at an interface between the positive electrode material and the nonaqueous electrolytic solution so that the inherent electrochemical reaction of the battery is inhibited by the thus-generated decomposition product or gas. As in the case of the negative electrode, it is known that a coating film is also formed by the oxidation decomposition product on a surface of the positive electrode so as to play an important role such as suppression of oxidation and decomposition of the solvent and suppression of gas generation.

In this way, the commonly used lithium secondary batteries have a cause of deterioration of battery characteristics resulting from inhibition of lithium ion migration or swelling of the battery due to generation of the decomposition product or gas by decomposition of the nonaqueous electrolytic solution on the positive or negative electrode.

In order to overcome these problems and achieve improvements in battery characteristics such as long-term durability and output characteristics, it is important to form a SEI film high in ion conductivity, low in electron conductivity and stable over a long term of period. Various attempts have been made to positively form a stable SEI with the addition of a small amount (in general, 0.01 mass % to 10 mass %) of additive compound to the electrolytic solution.

For example, Patent Document 1 discloses the use of a nonaqueous solvent containing 0.1 wt % to 4 wt % of 1,3-propane sultone or 1,4-butane sultone so as to form a passivation film on a highly crystallized carbon material due to carbon surface activity and improve the cycle characteristics and storage characteristics of the battery.

Patent Documents 2 and 3 disclose the use of a nonaqueous electrolytic solution containing an unsaturated sultone, or a nonaqueous electrolytic solution containing an unsaturated sultone and a fluorine-substituted ethylene carbonate, so as to suppress decomposition of the solvent on the negative electrode, prevent a decrease of the capacity of the battery during high-temperature storage, suppress generation of gas and prevent a deterioration of the load characteristics of the battery.

Patent Document 4 discloses the use of a nonaqueous electrolytic solution containing at least one kind selected from the group consisting of 1,3,2-dioxathiolane-2,2-dioxide derivatives and 1,3-propanediol cyclic sulfate derivatives so as to improve the high-temperature storage characteristics of the battery.

Patent Document 5 discloses the use of a nonaqueous electrolytic solution containing a cyclic sulfonic ester with two sulfonyl groups so as to improve the cycle life of the battery and prevent an increase of the resistance of the battery by suppressing decomposition of the solvent of the electrolytic solution, suppressing elution of Mn from the positive electrode of lithium-manganese composite oxide and suppressing adhesion of the eluted Mn to the negative electrode.

Patent Document 6 discloses the use of a nonaqueous electrolytic solution containing a multimerized cyclic disulfonic ester compound so as to suppress decomposition of the solvent, improve the cycle life of the battery and prevent an increase of the resistance of the battery.

Patent Documents 7 and 8 each disclose the addition of a silicon compound such as fluorosilane compound to a nonaqueous electrolytic solution so as to provide the nonaqueous electrolyte battery with improved cycle characteristics, high-temperature storage characteristics and low-temperature characteristics by suppression of an increase of internal resistance.

Further, Patent Document 9 discloses the addition of a fluorosilane compound or difluorophosphate compound to a nonaqueous electrolytic solution so as to provide the nonaqueous electrolyte battery with improved low-temperature characteristics.

PRIOR ART DOCUMENTS

Patent Documents

Patent Document 1: Japanese Laid-Open Patent Publication No. 2000-003724
Patent Document 2: Japanese Laid-Open Patent Publication No. 2002-329528
Patent Document 3: International Publication No. 2007/043624
Patent Document 4: Japanese Laid-Open Patent Publication No. 2004-185931
Patent Document 5: Japanese Laid-Open Patent Publication No. 2004-281368
Patent Document 6: Japanese Laid-Open Patent Publication No. 2010-219011
Patent Document 7: Japanese Laid-Open Patent Publication No. 2004-039510
Patent Document 8: Japanese Laid-Open Patent Publication No. 2004-087459
Patent Document 9: Japanese Laid-Open Patent Publication No. 2007-149656
Patent Document 10: Japanese Laid-Open Patent Publication No. H10-139784

Non-Patent Documents

Non-Patent Document 1: Journal of Organic Chemistry (1957), 22, 1200-2
Non-Patent Document 2: Chemicke Zvesti (1964), 18, 21-7

SUMMARY OF THE INVENTION

Problems to be Solved by the Invention

Although electrolytic solutions for nonaqueous electrolyte batteries such as lithium ion batteries have already been put into practical use, there has still been a demand to develop an electrolytic solution having more excellent properties for use under more severe conditions on vehicles etc.

It cannot be said that it is satisfactorily possible to obtain a good balance between improvement of high-temperature storage characteristics under high-temperature conditions of 70° C. or higher and reduction of gas generation during high-temperature storage even in the case of using the electrolytic solution for the nonaqueous electrolyte battery containing the 1,3-propane sultone etc. as disclosed in Patent Document 1, the electrolytic solution for the nonaqueous electrolyte battery containing the unsaturated sultone as disclosed in Patent Document 2, the electrolytic solution for the nonaqueous nonelectrolyte battery containing the unsaturated sultone and fluorine-substituted ethylene carbonate as disclosed in Patent Document 3, the electrolytic solution for the nonaqueous nonelectrolyte battery containing the 1,3,2-dioxathiolane-2,2-dioxide (1,2-ethylene sulfate) derivative etc. as disclosed in Patent Document 4, the electrolytic solution for the nonaqueous electrolyte battery containing the cyclic sulfonic ester with two sulfonyl groups as disclosed in Patent Document 5, the electrolytic solution for the nonaqueous electrolyte battery containing the multimerized cyclic disulfonic ester compound as disclosed in Patent Document 6, or the electrolytic solution for the nonaqueous electrolyte battery containing the fluorosilane compound with a vinyl group as disclosed in Patent Documents 7 to 9. The electrolytic solution for the nonaqueous electrolyte battery is still in need of improvement.

Means for Solving the Problems

The present invention provides an electrolytic solution for a nonaqueous electrolyte battery (hereinafter also simply referred to as "nonaqueous electrolytic solution" or "electrolytic solution") comprising the following components:
(I) at least one kind of silane compound represented by the following general formula (1);
(II) at least one kind selected from the group consisting of a cyclic sulfonic acid compound and a cyclic sulfuric ester compound;
(III) a nonaqueous organic solvent; and
(IV) a solute.

$$Si(R^1)_x(R^2)_{4-x} \qquad (1)$$

In the general formula (1), $R^1$ is each independently a carbon-carbon unsaturated bond-containing group; $R^2$ is each independently selected from a fluorine group and a $C_1$-$C_{10}$ linear or $C_3$-$C_{10}$ branched alkyl group which may have a fluorine atom and/or an oxygen atom; and x is an integer of 2 to 4.

In the present invention, it is important that the electrolytic solution for the nonaqueous electrolyte battery contains both of: (I) at least one kind of silane compound represented by the general formula (1); and (II) at least one kind of cyclic sulfonic acid and cyclic sulfuric ester compounds. Only when these components are contained together in the electrolytic solution, the nonaqueous electrolyte battery with the electrolytic solution achieves improvement of high-temperature storage characteristics under high-temperature conditions of 70° C. or higher and reduction of gas generation during high-temperature storage with a good balance.

The above component (II) is preferably at least one kind selected from the group consisting of compounds represented by the following general formulas (II-1a), (II-1b), (II-1c), (II-1d), (II-1e) and (II-1f).

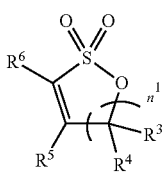
(II-1a)

In the general formula (II-1a), O is an oxygen atom; S is a sulfur atom; $R^3$ to $R^6$ are each independently selected from a hydrogen atom, a fluorine atom a $C_1$-$C_5$ substituted or unsubstituted alkyl group and a $C_1$-$C_4$ substituted or unsubstituted fluoroalkyl group; and $n^1$ is an integer of 1 to 3.

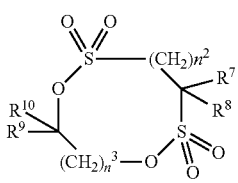
(II-1b)

In the general formula (II-1b), O is an oxygen atom; S is a sulfur atom; $R^7$ and $R^8$ are each independently selected from a hydrogen atom, a halogen atom, a $C_1$-$C_5$ substituted or unsubstituted alkyl group and a phenyl group; $R^9$ and $R^{10}$ are each independently selected from a hydrogen atom, a halogen atom, a $C_1$-$C_5$ substituted or unsubstituted alkyl group and a $C_1$-$C_4$ substituted or unsubstituted fluoroalkyl group; $n^2$ is an integer of 0 to 4; and $n^3$ is an integer of 0 to 4.

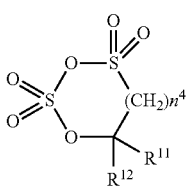
(II-1c)

In the general formula (II-1c), O is an oxygen atom; S is a sulfur atom; and $R^{12}$ are each independently selected from a hydrogen atom, a halogen atom, a $C_1$-$C_5$ substituted or unsubstituted alkyl group and a $C_1$-$C_4$ substituted or unsubstituted fluoroalkyl group; and $n^4$ is an integer of 0 to 3.

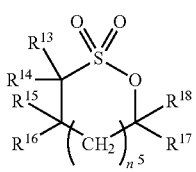
(II-1d)

In the general formula (II-1d), O is an oxygen atom; S is a sulfur atom; $R^{13}$ to $R^{18}$ are each independently selected from a hydrogen atom, a $C_1$-$C_6$ substituted or unsubstituted alkyl group and a $C_1$-$C_4$ substituted or unsubstituted fluoroalkyl group; and $n^5$ is an integer of 0 to 2.

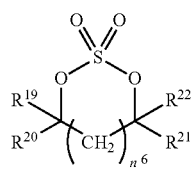
(II-1e)

In the general formula (II-1e), O is an oxygen atom; S is a sulfur atom; $R^{19}$ to $R^{22}$ are each independently selected from a hydrogen atom, a $C_1$-$C_5$ substituted or unsubstituted alkyl group, a $C_2$-$C_5$ substituted or unsubstituted alkenyl group, a $C_2$-$C_5$ substituted or unsubstituted alkynyl group and a $C_1$-$C_4$ substituted or unsubstituted fluoroalkyl group; $n^6$ is an integer of 0 to 1; and, when $n^6$ is 0, $R^{19}$ or $R^{20}$ and $R^{21}$ or $R^{22}$ may for a single bond.

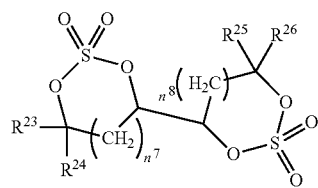
(II-1f)

In the general formula (II-1f), O is an oxygen atom; S is a sulfur atom; $R^{23}$ to $R^{26}$ are each independently selected from a hydrogen atom, a $C_1$-$C_5$ substituted or unsubstituted alkyl group and a $C_1$-$C_4$ substituted or unsubstituted fluoroalkyl group; $n^7$ and $n^8$ are each an integer of 0 to 1.

The cyclic sulfonic acid compound represented by the general formula (II-1a) is preferably at least one kind selected from the group consisting of 1,3-propene sultone, 1,4-butene sultone, 2,4-pentene sultone, 3,5-pentene sultone, 1-fluoro-1,3-propene sultone, 1-trifluoromethyl-1,3-propene sultone, 1,1,1-trifluoro-2,4-butene sultone, 1,4-butene sultone and 1,5-pentene sultone.

It is particularly preferable that the cyclic sulfonic acid compound represented by the general formula (II-1a) is at least one kind selected from the group consisting of 1,3-propene sultone and 1,4-butene sultone.

The cyclic sulfonic acid compound represented by the general formula (II-1b) is preferably at least one kind selected from the group consisting of the following compounds No. 2-1 to 2-29.

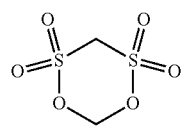

Compound No. 2-1

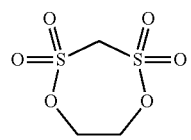

Compound No. 2-2

-continued
Compound No. 2-3
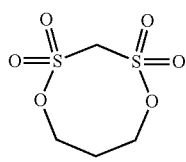
Compound No. 2-4
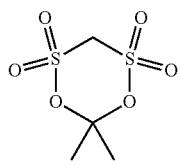
Compound No. 2-5
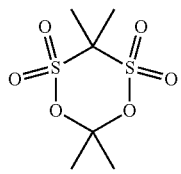
Compound No. 2-6
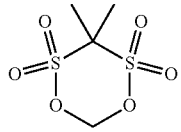
Compound No. 2-7
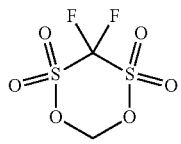
Compound No. 2-8
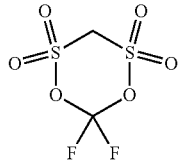
Compound No. 2-9
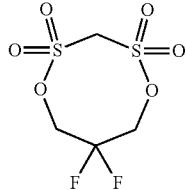
Compound No. 2-10
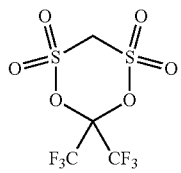
Compound No. 2-11
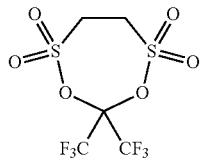
-continued
Compound No. 2-12
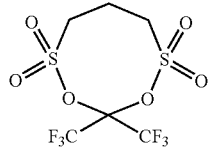
Compound No 2-13
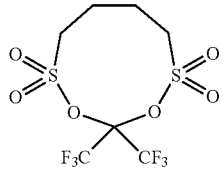
Compound No. 2-14
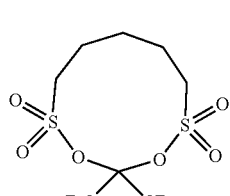
Compound No. 2-15
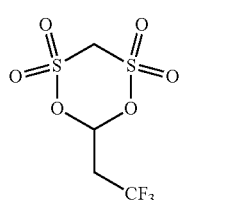
Compound No. 2-16
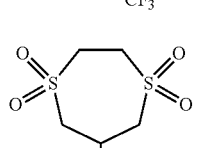
Compound No. 2-17
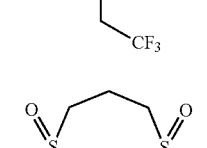
Compound No. 2-18
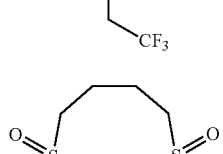
Compound No. 2-19
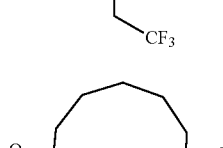
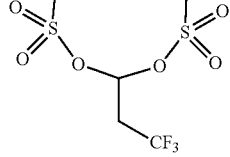

Compound No. 2-20

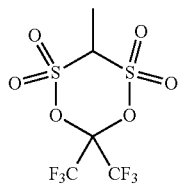

Compound No. 2-21

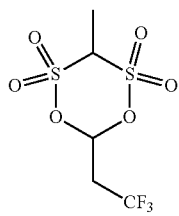

Compound No. 2-22

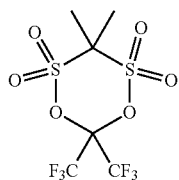

Compound No. 2-23

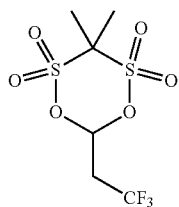

Compound No. 2-24

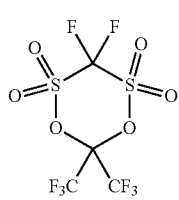

Compound No. 2-25

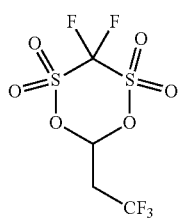

Compound No. 2-26

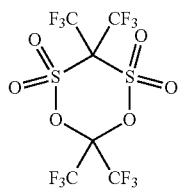

Compound No. 2-27

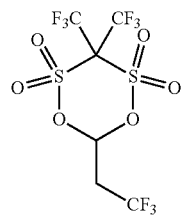

Compound No. 2-28

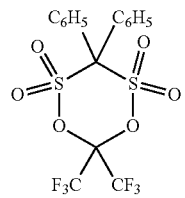

Compound No. 2-29

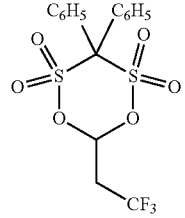

It is particularly preferable that the cyclic sulfonic acid compound represented by the general formula (II-1b) is at least one kind selected from the group consisting of the following compounds No. 2-1, No. 2-2, No. 2-10, No. 2-15 and No. 2-16.

Compound No. 2-1

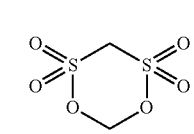

Compound No. 2-2

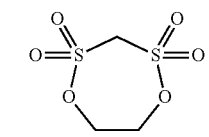

Compound No. 2-10

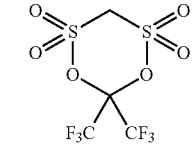

Compound No. 2-15

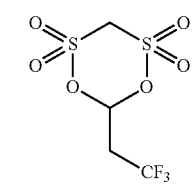

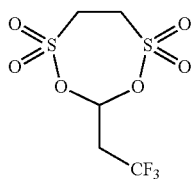
Compound No. 2-16

The cyclic sulfonic acid compound represented by the general formula (II-1c) is preferably at least one kind selected from the group consisting of the following compounds No. 3-1 to 3-5.

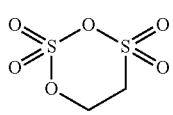
Compound No. 3-1

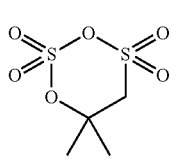
Compound No. 3-2

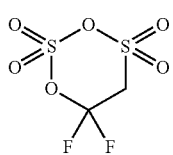
Compound No. 3-3

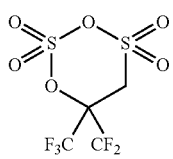
Compound No. 3-4

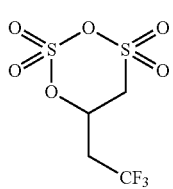
Compound No. 3-5

It is particularly preferable that the cyclic sulfonic acid compound represented by the general formula (II-1c) is at least one kind selected from the group consisting of the following compounds No. 3-1, No. 3-2 and No. 3-5.

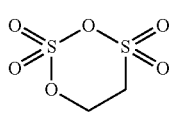
Compound No. 3-1

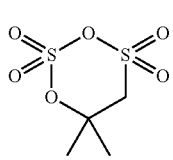
Compound No. 3-2

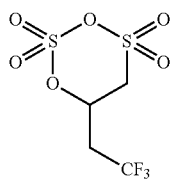
Compound No. 3-5

The cyclic sulfonic acid compound represented by the general formula (II-1d) is preferably at least one kind selected from the group consisting of 1,3-propane sultone, α-trifluoromethyl-γ-sultone, β-trifluoromethyl-γ-sultone, γ-trifluoromethyl-γ-sultone, α-methyl-γ-sultone, α,β-di(trifluoromethyl)-γ-sultone, α,α-di(trifluoromethyl)-γ-sultone, α-heptafluoropropyl-γ-sultone, 1,4-butane sultone and 1,5-pentane sultone.

It is particularly preferable that the cyclic sulfonic acid compound represented by the general formula (II-1d) is at least one kind selected from the group consisting of 1,3-propane sultone and 1,4-butane sultone.

The cyclic sulfuric ester compound represented by the general formula (II-1e) is preferably at least one kind selected from the group consisting of the following compounds No. 4-1 to 4-8.

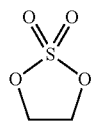
Compound No. 4-1

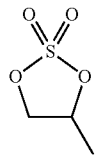
Compound No. 4-2

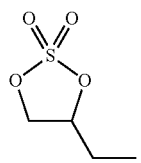
Compound No. 4-3

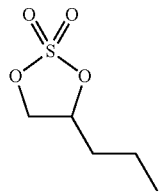
Compound No. 4-4

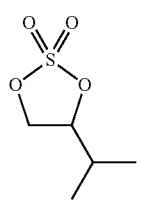
Compound No. 4-5

-continued

Compound No. 4-6

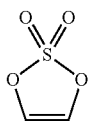

Compound No. 4-7

Compound No. 4-8

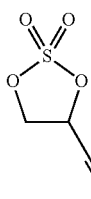

The cyclic sulfuric ester compound represented by the general formula (II-1f) is preferably at least one kind selected from the group consisting of the following compounds No. 5-1 to 5-3.

Compound No. 5-1

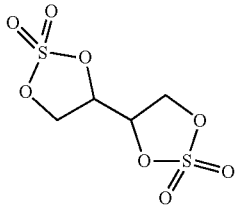

Compound No. 5-2

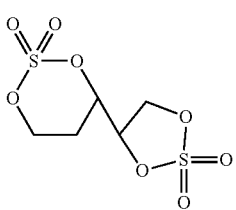

Compound No. 5-3

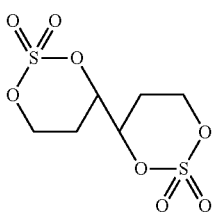

It is preferable that $R^1$ in the general formula (1) is each independently a group selected from the group consisting of vinyl, allyl, 1-propenyl, 2-propenyl, ethynyl and 2-propynyl.

It is preferable that $R^2$ in the general formula (1) is each independently a group selected from the group consisting of fluorine, methyl, ethyl, propyl, 2,2,2-trifluoroethyl, 2,2,3,3-tetrafluoropropyl, 1,1,1-trifluoroisopropyl, 1,1,1,3,3,3-hexafluoroisopropyl, 2,2,2-trifluoroethoxy, 2,2,3,3-tetrafluoropropoxy, 2,2,3,3,3-pentafluoropropoxy, 1,1,1-trifluoroisopropoxy and 1,1,1,3,3,3-hexafluoroisopropoxy.

It is further preferable that x in the general formula (1) is 3 to 4.

The total amount of the component (I) is preferably 0.001 to 10.0 mass % relative to 100 mass % of the total amount of the components (I), (II), (III) and (IV).

The total amount of the component (II) is preferably 0.01 to 10.0 mass % relative to 100 mass % of the total amount of the components (I), (II), (III) and (IV).

The component (IV) is preferably a solute containing at least one kind selected from the group consisting of lithium hexafluorophosphate ($LiPF_6$), lithium tetrafluoroborate ($LiBF_4$), lithium bis(trifluoromethanesulfonyl)imide ($LiN(CF_3SO_2)_2$), lithium bis(fluorosulfonyl)imide ($LiN(FSO_2)_2$), lithium bis(difluorophosphonyl)imide ($LiN(POF_2)_2$), lithium (difluorophosphonyl)(fluorosulfonyl)imide ($LiN(POF_2)(FSO_2)$) and lithium difluorophosphate ($LiPO_2F_2$).

The component (III) is preferably a nonaqueous organic solvent containing at least one kind selected from the group consisting of cyclic carbonate, linear carbonate, cyclic ester, linear ester, cyclic ether, linear ether, sulfone compound, sulfoxide compound and ionic liquid.

It is preferable that the electrolytic solution further contains a fluorine-containing carbonate. The fluorine-containing carbonate is preferably at least one kind selected from the group consisting of fluoroethylene carbonate, 4,4-difluoroethylene carbonate, 4,5-difluoroethylene carbonate and 4,5-difluoro-4,5-dimethylethylene carbonate.

It is preferable that the electrolytic solution further contains a compound represented by the following general formula (V).

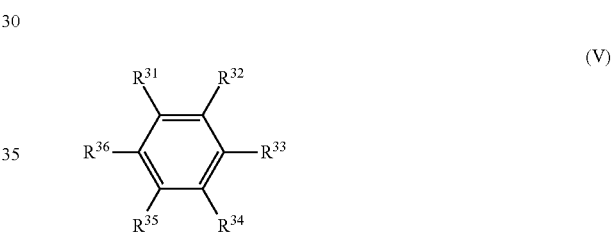

(V)

In the general formula (V), $R^{31}$ to $R^{36}$ are each independently a hydrogen atom, a $C_1$-$C_{12}$ hydrocarbon group, or a halogen atom; and $R^{31}$ to $R^{36}$ may be bonded together to form a ring.

The present invention also provides a nonaqueous electrolyte battery (hereinafter also simply referred to as "battery") comprising at least a positive electrode, a negative electrode and the above-mentioned electrolytic solution.

In the present invention, the electrolytic solution is provided so as to achieve improvement of high-temperature storage characteristics under high-temperature conditions of 70° C. or higher and reduction of gas generation during high-temperature storage with a good balance. Further, there is provided the nonaqueous electrolyte battery using such an electrolytic solution.

DETAILED DESCRIPTION OF EMBODIMENTS

Hereinafter, the present invention will be described below in detail. It should be understood that: the following description of the respective components is merely an embodiment of the present invention and is not intended to limit the present invention thereto; and various changes and modifications of the following embodiment can be made as appropriate within the scope of the present invention.

The present invention provides an electrolytic solution for a nonaqueous electrolyte battery, containing the following components:

(I) at least one kind of silane compound represented by the following general formula (1);
(II) at least one kind selected from the group consisting of a cyclic sulfonic acid compound and a cyclic sulfuric ester compound;
(III) a nonaqueous organic solvent; and
(IV) a solute.

$$Si(R^1)_x(R^2)_{4-x} \qquad (1)$$

In the general formula (1), $R^1$ is each independently a carbon-carbon unsaturated bond-containing group; $R^2$ is each independently selected from a fluorine group and a $C_1$-$C_{10}$ linear or $C_3$-$C_{10}$ branched alkyl group which may have a fluorine atom and/or an oxygen atom; and x is an integer of 2 to 4.

1. Electrolytic Solution for Nonaqueous Electrolyte Battery

Component (I)

The component (I) is contained in the nonaqueous electrolytic solution to be decomposed on positive and negative electrodes and thereby form a coating film with good ion conductivity on surfaces of the positive and negative electrodes. The thus-formed coating film has the effect of preventing direct contact between the nonaqueous solvent or solute and the electrode active material so as to suppress decomposition of the nonaqueous solvent or solute and prevent a deterioration of battery characteristics whereby it is possible to improve the high-temperature cycle characteristics and high-temperature storage characteristics of the nonaqueous electrolyte battery.

Examples of the carbon-carbon unsaturated bond-containing group as $R^1$ in the general formula (1) are: $C_2$-$C_8$ alkenyl groups, such as vinyl, allyl, 1-propenyl, 2-propenyl, isopropenyl, 2-butenyl and 1,3-butadienyl, and alkenyloxy groups derived therefrom; $C_2$-$C_8$ alkynyl groups, such as ethynyl, 2-propynyl and 1,1-dimethyl-2-propynyl, and alkynyloxy groups derived therefrom; and $C_6$-$C_{12}$ aryl groups, such as phenyl, tolyl and xylyl, and aryloxy groups derived therefrom. The carbon-carbon unsaturated bond-containing group may contain a fluorine atom and an oxygen atom. Among others, the carbon-carbon unsaturated bond-containing group of 6 or less carbon atoms is preferred. When the carbon-carbon unsaturated bond-containing group of 6 or more carbon atoms is used, the resistance of the coating film on the electrode tends to be relatively high. It is particularly preferable that the carbon-carbon unsaturated bond-containing group is selected from the group consisting of vinyl, allyl, 1-propenyl, 2-propenyl, ethynyl and 2-propynyl.

Examples of the alkyl group as $R^2$ in the general formula (1) are $C_1$-$C_{12}$ alkyl groups such as methyl, ethyl, propyl, isopropyl, n-butyl, sec-butyl, isobutyl, tert-butyl and pentyl. The alkyl group may contain a fluorine atom and an oxygen atom. Examples of the oxygen-containing alkyl group are alkoxy groups derived from the above alkyl groups. When the above alkyl group or alkoxy group is used, the resistance of the coating film on the electrode tends to be lower. Thus, the above alkyl group or alkoxy group is preferred from the viewpoint of output characteristics. It is particularly preferable to use any group selected from the group consisting of methyl, ethyl, propyl, 2,2,2-trifluoroethyl, 2,2,3,3-tetrafluoropropyl, 1,1,1-trifluoroisopropyl, 1,1,1,3,3,3-hexafluoroisopropyl, 2,2,2-trifluoroethoxy, 2,2,3,3-tetrafluoropropoxy, 2,2,3,3,3-pentafluoropropoxy, 1,1,1-trifluoroisopropoxy and 1,1,1,3,3,3-hexafluoroisopropoxy in order to impart better high-temperature cycle characteristics and high-temperature storage characteristics to the nonaqueous electrolyte battery without causing an increase of the above-mentioned resistance.

In order to form a coating film on the electrodes and achieve the object of the present invention, it is necessary that the number x of carbon-carbon unsaturated bond-containing groups in the general formula (1) is 2 to 4. The number n is more preferably 3 to 4 in order to facilitate improvement in the high-temperature cycle characteristics and high-temperature storage characteristics of the battery. The reason for this is unknown, but is assumed that it becomes easier to form a stronger coating film.

Examples of the silane compound represented by the general formula (1) are the following compounds No. 1-1 to 1-25. The silane compound used in the present invention is however not limited to the following examples.

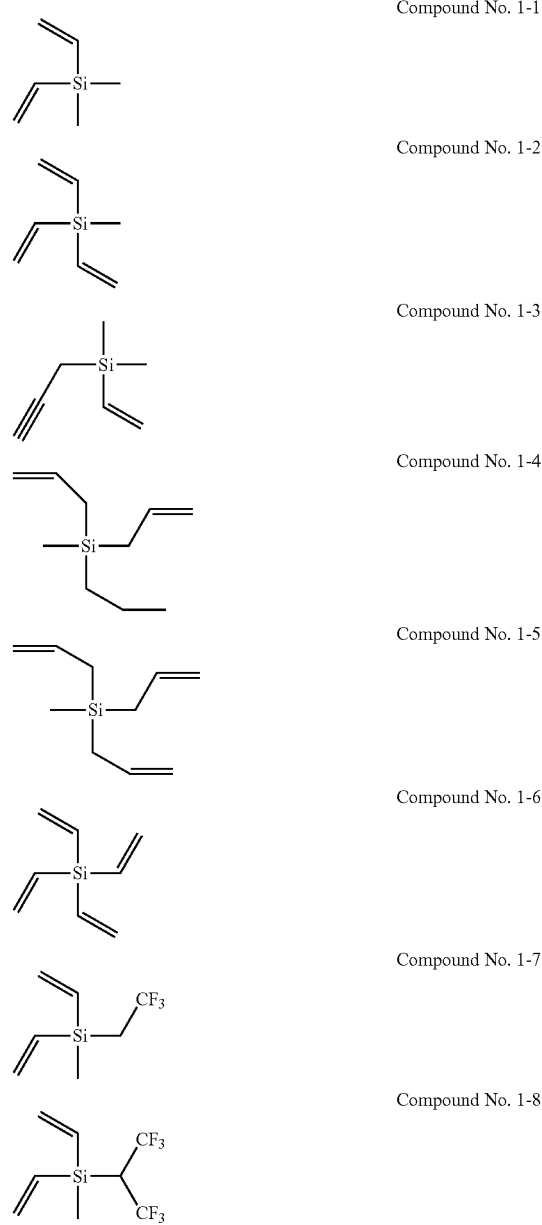

-continued

Compound No. 1-9
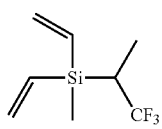

Compound No. 1-10
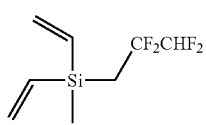

Compound No. 1-11
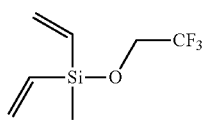

Compound No. 1-12
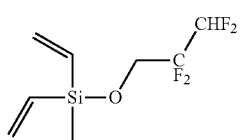

Compound No. 1-13
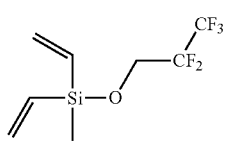

Compound No. 1-14
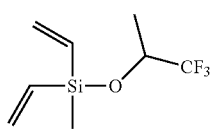

Compound No. 1-15
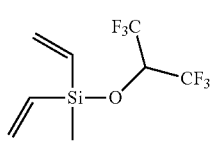

Compound No. 1-16
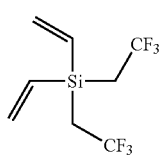

Compound No. 1-17
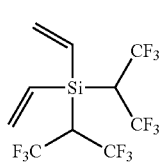

Compound No. 1-18
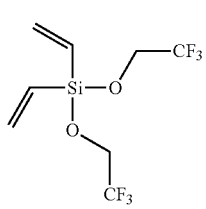

Compound No. 1-19
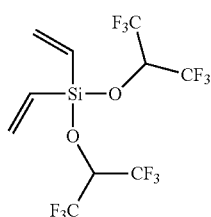

Compound No. 1-20
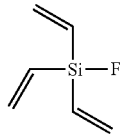

Compound No. 1-21
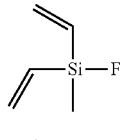

Compound No. 1-22
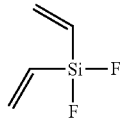

Compound No. 1-23
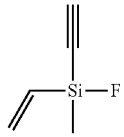

Compound No. 1-24
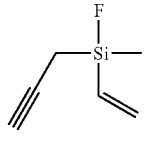

Compound No. 1-25

The silane compound represented by the general formula (1) can be produced with reference to a method of producing a carbon-carbon unsaturated bond-containing silicon compound by reacting a silicon compound having a silanol group or hydrolyzable group with a carbon-carbon unsaturated bond-containing organometallic reagent and thereby replacing OH of the silanol group or the hydrolyzable group with a carbon-carbon unsaturated bond as described in e.g. Patent Document 10 and Non-Patent Documents 1 and 2.

The total amount of the component (I) relative to 100 mass % of the total amount of the components (I), (II), (III) and (IV) (hereinafter referred to as the "concentration of the component (I)") is preferably 0.001 mass % or more, more preferably 0.01 mass % or more, still more preferably 0.1 mass % or more, in terms of its lower limit. Further, the concentration of the component (I) is preferably 10.0 mass % or less, more preferably 5.0 mass % or less, still more preferably 2.0 mass % or less, in terms of its upper limit. When the concentration of the component (I) is less than 0.001 mass %, it is unfavorably difficult to obtain a sufficient improvement in the high-temperature cycle characteristics and high-temperature storage characteristics of the nonaqueous electrolyte battery with the electrolytic solution. When the concentration of the component (I) exceeds 10.0 mass %, on the other hand, the nonaqueous electrolytic solution becomes high in viscosity so that it is unfavorably difficult to obtain a sufficient improvement in the high-temperature cycle characteristics of the nonaqueous electrolyte battery with the electrolytic solution. It is feasible to use, as the component (I), one kind of the silane compound solely or any combination of two or more kinds of the silane compounds at any mixing ratio depending on the purpose of use of the battery as long as the concentration of the component (I) does not exceeds 10.0 mass %.

Component (II)

The component (II) is contained in the nonaqueous electrolytic solution to form a stable coating film on positive and negative electrode surfaces. The thus-formed coating film has the effect of preventing a deterioration of battery characteristics and thereby improving the high-temperature cycle characteristics and high-temperature storage characteristics of the nonaqueous electrolyte battery.

The component (II) is preferably at least one kind selected from the group consisting of compounds represented by the above general formulas (II-1a), (II-1b), (II-1c), (II-1d), (II-1e) and (II-1f).

As the cyclic sulfonic acid compound represented by the general formula (II-1a) (hereinafter also referred to as "unsaturated bond-containing cyclic sulfonate"), it is preferable to use at least one kind selected from the group consisting of 1,3-propene sultone, 1,4-butene sultone, 2,4-pentene sultone, 3,5-pentene sultone, 1-fluoro-1,3-propene sultone, 1-trifluoromethyl-1,3-propene sultone, 1,1,1-trifluoro-2,4-butene sultone, 1,4-butene sultone and 1,5-pentene sultone. It is more preferable to use 1,3-propene sultone (1,3-PRS) or 1,4-butene sultone from the viewpoint of reactivity in the battery system. The above unsaturated bond-containing cyclic sulfonates can be used solely or in combination of two or more kinds thereof.

As the cyclic sulfonic acid compound represented by the general formula (II-1b) (hereinafter also referred to as "cyclic disulfonate"), it is preferable to use at least one kind selected from the group consisting of the above exemplified compounds No. 2-1 to 2-29. It is more preferable to use at least one kind selected from the group consisting of the compounds No. 2-1, No. 2-2, No. 2-10, No. 2-15 and No. 2-16. The cyclic disulfonate represented by the general formula (II-1b) is not limited to the compounds No. 2-1 to 2-29. There can be used any other cyclic disulfonate compound.

As the cyclic sulfonic acid compound represented by the general formula (II-1c) (hereinafter also referred to as "cyclic disulfonate"), it is preferable to use at least one kind selected from the group consisting of the above exemplified compounds No. 3-1 to 3-5. It is more preferable to use at least one kind selected from the group consisting of the compounds No. 3-1, No. 3-2 and No. 3-5. The cyclic disulfonate represented by the general formula (II-1c) is not limited to the compounds No. 3-1 to 3-5. There can be used any other cyclic disulfonate compound.

As the cyclic sulfonic acid compound represented by the general formula (II-1d) (hereinafter also referred to as "cyclic sulfonate"), it is preferable to use at least one kind selected from the group consisting of 1,3-propane sultone (1,3-PS), α-trifluoromethyl-γ-sultone, β-trifluoromethyl-γ-sultone, γ-trifluoromethyl-γ-sultone, α-methyl-γ-sultone, α,β-di(trifluoromethyl)-γ-sultone, α,α-di(trifluoromethyl)-γ-sultone, α-heptafluoropropyl-γ-sultone, 1,4-butane sultone (1,4-BS) and 1,5-pentane sultone. It is more preferable to use at least one kind selected from the group consisting of 1,3-propane sultone (1,3-PS) and 1,4-butane sultone (1,4-BS). Among others, 1,3-propane sultone (1,3-PS) is particularly preferred because this compound is considered to form a coating film by decomposition thereof on a negative electrode of a nonaqueous electrolyte battery as described in Japanese Laid-Open Patent Publication No. 2009-070827. The above cyclic sulfonates can be used solely or in combination of two or more kinds thereof.

As the cyclic sulfuric ester compound represented by the general formula (II-1e) (hereinafter also referred to as "cyclic sulfate"), it is preferable to use at least one kind selected from the group consisting of the above exemplified compounds No. 4-1 to 4-8. It is more preferable to use the compound No. 4-1 or the compound No. 4-4. The above cyclic sulfates can be used solely or in combination of two or more kinds thereof. However, some of the cyclic sulfates are slightly lower in stability in the electrolytic solution. It is thus preferable to use this kind of cyclic sulfate in combination with at least one kind selected from the group consisting of the cyclic sulfonic acid compounds represented by the general formulas (II-1a) to (II-1d) in view of good balance between the stability, improvement of high-temperature storage characteristics under high-temperature conditions of 70° C. or higher and reduction of gas generation during high-temperature storage.

As the cyclic sulfuric ester compound represented by the general formula (II-1f) (hereinafter also referred to as "cyclic sulfate"), it is preferable to use at least one kind selected from the group consisting of the above exemplified compounds No. 5-1 to 5-3. It is more preferable to use the compound No. 5-1. The above cyclic sulfates can be used solely or in combination of two or more kinds thereof. However, some of the cyclic sulfates are slightly lower in stability in the electrolytic solution. It is thus preferable to use this kind of cyclic sulfate in combination with at least one kind selected from the group consisting of the cyclic sulfonic acid compounds represented by the general formulas (II-1a) to (II-1d) in view of good balance between the stability, improvement of high-temperature storage characteristics under high-temperature conditions of 70° C. or higher and reduction of gas generation during high-temperature storage.

The total amount of the component (II) relative to 100 mass % of the total amount of the components (I), (II), (III) and (IV) (hereinafter referred to as the "concentration of the component (II)") is preferably 0.01 mass % or more, more preferably 0.05 mass % or more, still more preferably 0.1 mass % or more, in terms of its lower limit. Further, the concentration of the component (II) is preferably 10.0 mass % or less, more preferably 5.0 mass % or less, still more preferably 2.0 mass % or less, in terms of its upper limit. When the concentration of the component (II) is less than 0.01 mass %, it is unfavorably difficult to obtain a sufficient improvement in the high-temperature cycle characteristics and high-temperature storage characteristics of the nonaqueous electrolyte battery with the electrolytic solution. When the concentration of the component (II) exceeds 10.0 mass %, it is unfavorably difficult to obtain a sufficient improvement in the high-temperature cycle characteristics and high-temperature storage characteristics of the nonaqueous electrolyte battery with the electrolytic solution. It is feasible to use, as the component (II), one kind of the cyclic sulfonic acid or sulfuric ester compound solely or any combination of two or more kinds of the cyclic sulfonic acid and sulfuric ester compounds at any mixing ratio depending on the purpose of use of the battery as long as the concentration of the component (II) does not exceeds 10.0 mass %.

As mentioned above, the component (I) is decomposed on positive and negative electrodes to form a coating film with good ion conductivity on surfaces of the positive and negative electrodes. The thus-formed coating film is effective in preventing direct contact between the nonaqueous solvent or solute and the electrode active material so as to suppress decomposition of the nonaqueous solvent or solute and prevent a deterioration of battery characteristics. However, the nonaqueous electrolyte battery may not attain sufficient high-temperature storage characteristics under high-temperature conditions of 70° C. or higher in the case of using only the component (I) rather than using the components (I) and (II) in combination.

The component (II) is used to form a stable coating film on positive and negative electrode surfaces as mentioned above. The thus-formed coating film is effective in preventing a deterioration of battery characteristics. The nonaqueous electrolyte battery may, however, also not attain sufficient high-temperature storage characteristics under high-temperature conditions of 70° C. or higher in the case of using only the component (II) rather than using the components (I) and (II) in combination.

It is thus important to use the components (I) and (II) in combination in the electrolytic solution for the nonaqueous electrolyte battery according to the present invention.

The mechanism for improvement of high-temperature storage characteristics under high-temperature conditions of 70° C. or higher in the case of using the components (I) and (II) in combination, as compared to the case of using the component (I) or (II) alone, is not clear but is assumed to be that the coexistence of the components (I) and (II) makes it possible to form a better coating film derived from the mixed composition of the components (I) and (II) so as to thereby suppress decomposition of the solvent or solute under high-temperature conditions, or to cover the surface of a coating film of the component (I) by a coating film of the component (II) so as to suppress reaction of the coating film of the component (I) with the solvent or solute under high-temperature conditions.

Furthermore, the amount of gas generated from the electrolytic solution under high-temperature conditions of 70° C. or higher tends to be smaller in the case of using the components (I) and (II) in combination than in the case of using the component (I) or (II) alone. This decomposition gas generation reduction effect is assumed as the result of the formation of the above-mentioned good coating film.

Accordingly, the improvement of high-temperature storage characteristics under high-temperature conditions of 70° C. or higher and the reduction of gas generation during high-temperature storage are achieved with a good balance by the combined use of the components (I) and (II) as mentioned above as compared to the case of using the component (I) or (II) alone.

Component (III)

In the case of using a nonaqueous solvent, the electrolytic solution for the nonaqueous electrolyte battery is called a nonaqueous liquid electrolyte. In the case of using a polymer, the electrolytic solution for the nonaqueous electrolyte battery is called a polymer solid electrolyte. Herein, the term "polymer solid electrolyte" includes those containing a nonaqueous solvent as a plasticizer.

In the present invention, there is no particular limitation on the nonaqueous organic solvent used as the component (III) as long as the nonaqueous organic solvent is an aprotic solvent capable of dissolving therein the components (I), (II) and (IV). The nonaqueous organic solvent can be a carbonate, an ester, an ether, a lactone, a nitrile, an imide, a sulfone or the like. Further, the nonaqueous organic solvent can be a single solvent or a mixed solvent of two or more kinds. Specific examples of the nonaqueous organic solvent are ethyl methyl carbonate, dimethyl carbonate, diethyl carbonate, methyl propyl carbonate, ethyl propyl carbonate, methyl butyl carbonate, ethylene carbonate, propylene carbonate, butylene carbonate, methyl acetate, ethyl acetate, methyl propionate, ethyl propionate, methyl 2-fluoropropionate, ethyl 2-fluoropropionate, diethyl ether, acetonitrile, propionitrile, tetrahydrofuran, 2-methyltetrahydrofuran, furan, tetrahydropyrane, 1,3-dioxane, 1,4-dioxane, dibutyl ether, diisopropyl ether, 1,2-dimethoxyethane, N,N-dimethylformamide, dimethylsulfoxide, sulfolane, γ-butyrolactone and γ-valerolactone.

There is no particular limitation on the polymer used for production of the polymer solid electrolyte as long as the polymer is an aprotic polymer capable of dissolving therein the components (I), (II) and (IV). Examples of the polymer are a polymer having polyethylene oxide in its main chain or side chain, a homopolymer or copolymer of polyvinylidene fluoride, a methacrylate polymer and a polyacrylonitrile. When the plasticizer is added to the polymer, any of the above aprotic organic solvent can be used as the plasticizer.

Component (IV)

There is no particular limitation on the solute. A salt having an arbitrary pair of cation and anion can be used as the solute. Examples of the solute are those having alkali metal ions such as lithium ion and sodium ion, alkaline-earth metal ions and quaternary ammonium as cations and anions derived from hexafluorophosphoric acid, tetrafluoroboric acid, perchloric acid, hexafluoroarsenic acid, hexafluoroantimonic acid, trifluoromethanesulfonic acid, bis(trifluoromethanesulfonyl)imide, bis(pentafluoroethanesulfonyl)imide, (trifluoromethanesulfonyl)(pentafluoroethanesulfonyl)imide, bis(fluorosulfonyl)imide, (trifluoromethanesulfonyl)(fluorosulfonyl)imide, (pentafluoroethanesulfonyl)(fluorosulfonyl)imide, tris(trifluoromethanesulfonyl)methide, bis(difluorophosphonyl)imide, (difluorphsphonyl)(fluorosulfonyl)imide and difluorophosphoric acid. These solutes can be used solely or in any combination of two or more kinds thereof at any mixing ratio depending on the purpose of use of the battery. From the viewpoint of battery energy density, output characteristics and life, preferred are salts having cations derived from lithium, sodium, magnesium and quaternary ammonium and anions derived from hexafluorophosphoric acid, tetrafluoroboric acid, bis(trifluoromethanesulfonyl)imide, bis(fluorosulfonyl)imide, bis(difluorophosphonyl)imide, (difluorophsphonyl)(fluorosulfonyl)imide and difluorophosphoric acid.

There is no particular limitation on the total amount of the component (IV) relative to 100 mass % of the total amount of the components (I), (II), (III) and (IV) (hereinafter referred to as the "concentration of the component (IV)"). The lower limit of the concentration of the component (IV) is generally 0.5 mol/L or more, preferably 0.7 mol/L or more, more preferably 0.9 mol/L or more. The upper limit of the concentration of the component (IV) is generally 5.0 mol/L or less, preferably 4.0 mol/L or less, more preferably 2.0 mol/L or less. When the concentration of the component (IV) is less than 0.5 mol/L, the cycle characteristics and output characteristics of the nonaqueous electrolyte battery may be lowered due to a decrease of ion conductivity. When the concentration of the component (IV) exceeds 5.0 mol/L, on the other hand, the nonaqueous electrolytic solution becomes high in viscosity to cause a decrease of ion conductivity so that the cycle characteristics and output characteristics of the nonaqueous electrolyte battery may be lowered.

Other Additives

Any commonly used additive may be added at any ratio to the electrolytic solution for the nonaqueous electrolyte battery within the range that does not impair the effects of the present invention. Examples of the additive are compounds having overcharge preventing function, negative electrode coating function, positive electrode coating function etc., such as cyclohexylbenzene, biphenyl, t-butylbenzene, vinylene carbonate, vinylethylene carbonate, difluoroanisole and fluorine-containing carbonate.

It is preferable that the electrolytic solution contains a fluorine-containing carbonate in terms of further improvement in the high-temperature storage characteristics of the battery under high-temperature conditions of 70° C. or higher and reduction of gas generation during high-temperature storage of the battery. As the fluorine-containing carbonate, there can be used a compound represented by the following general formula (2).

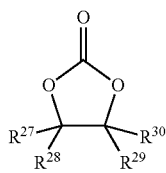
(2)

In the general formula (2), O is an oxygen atom; $R^{27}$ to $R^{30}$ are each independently selected from a hydrogen atom, an alkyl group, a halogen atom, a halogen-containing alkyl group and a halogen-containing aryl group with the proviso that at least one of $R^{27}$ to $R^{30}$ is a fluorine atom; and $R^{27}$ to $R^{30}$ may contain an ether bond.

Among the compound represented by the general formula (2), it is particularly preferable that the electrolytic solution contains at least one kind of compound selected from the group consisting of fluoroethylene carbonate, 4,4-difluoroethylene carbonate, 4,5-difluoroethylene carbonate and 4,5-difluoro-4,5-dimethylethylene carbonate so that the nonaqueous electrolyte battery can easily attain better high-temperature storage characteristics under high-temperature conditions of 70° C. or higher and reduction of gas generation during high-temperature storage.

The electrolytic solution for the nonaqueous electrolyte battery may be used in a quasi-solid state with the addition of a gelling agent or a cross-linked polymer as in the case of a nonaqueous electrolyte battery called a polymer battery.

It is further preferable that the electrolytic solution contains, as the other additive, a compound represented by the general formula (V).

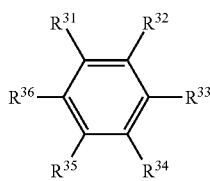
(V)

In the general formula (V), $R^{31}$ to $R^{36}$ are each independently a hydrogen atom, a $C_1$-$C_{12}$ hydrocarbon group, or a halogen atom; and $R^{31}$ to $R^{36}$ may be bonded together to form a ring.

Examples of the compound represented by the general formula (V) are the following compounds No. V-1 to V-29. Among others, it is particularly preferable to use at least one kind of the following compounds No. V-12 and No. V-2.

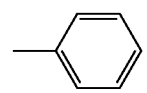
Compound No. V-1

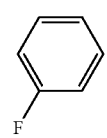
Compound No. V-2

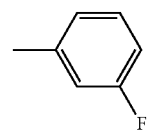
Compound No. V-3

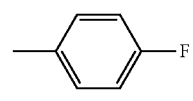
Compound No. V-4

Compound No. V-5

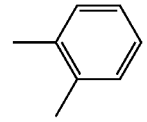
Compound No. V-6

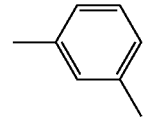
Compound No. V-7

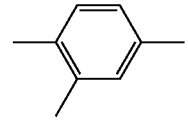
Compound No. V-8

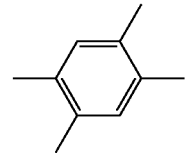
Compound No. V-9

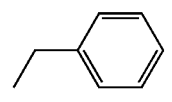
Compound No. V-10

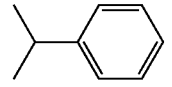
Compound No. V-11

-continued

Compound No. V-12

Compound No. V-13

Compound No. V-14

Compound No. V-15

Compound No. V-16

Compound No. V-17

Compound No. V-18

Compound No. V-19

Compound No. V-20

Compound No. V-21

Compound No. V-22

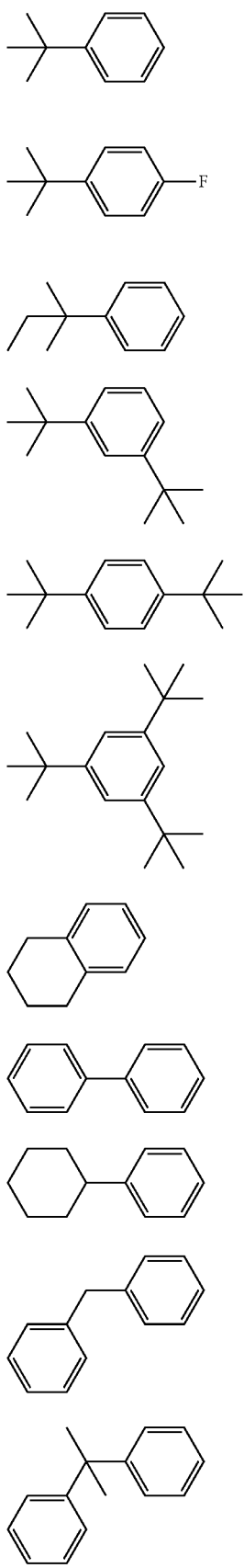

-continued

Compound No. V-23

Compound No. V-24

Compound No. V-25

Compound No. V-26

Compound No. V-27

Compound No. V-28

Compound No. V-29

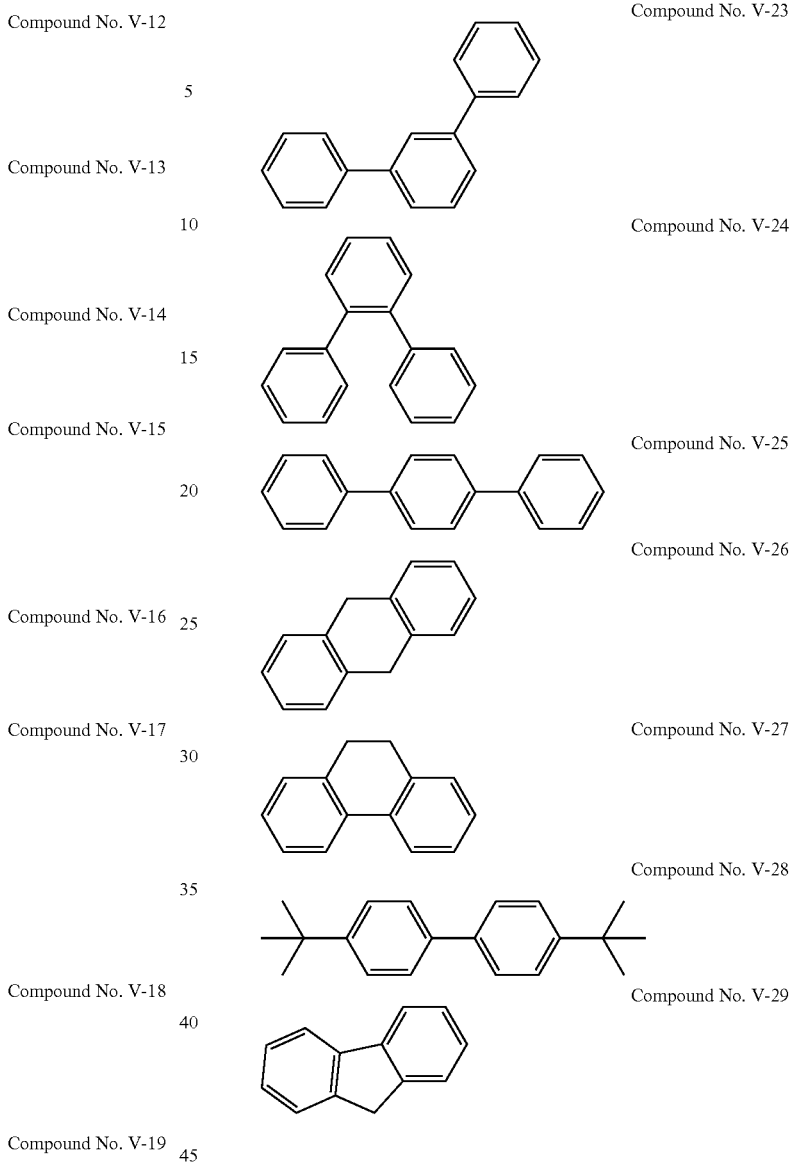

2. Nonaqueous Electrolyte Battery

The nonaqueous electrolyte battery is provided as an electrochemical device using: an electrolytic solution for a nonaqueous electrolyte battery; a negative electrode material capable of reversibly occluding and releasing an alkali metal ion, such as lithium ion or sodium ion, or alkaline-earth metal ion; and a positive electrode material capable of reversibly occluding and releasing an alkali metal ion, such as lithium ion or sodium ion, or alkaline-earth metal ion.

There is no particular limitation on the negative electrode. The negative electrode is formed using a material capable of reversibly occluding and releasing an alkali metal ion, such as lithium ion or sodium ion, or alkaline-earth metal ion. There is no particular limitation on the positive electrode. The positive electrode is formed using a material capable of reversibly occluding and releasing an alkali metal ion, such as lithium ion or sodium ion, or alkaline-earth metal ion.

In the case where the cation is lithium ion, usable examples of the negative electrode material are: lithium metal; alloys and intermetallic compounds of lithium with other metals; and various carbon materials, metal oxides, metal nitrides, activated carbons and conductive polymers each capable of occluding and releasing lithium. As the carbon materials, there can be used graphitizable, non-graphitizable carbon (also called hard carbon) with a (002) plane interval of 0.37 nm or greater, graphite with a (002) plane interval of 0.34 nm or smaller, and the like. The graphite can be artificial graphite or natural graphite.

In the case where the cation is lithium ion, usable examples of the positive electrode material are: lithium-containing transition metal composite oxides such as $LiCoO_2$, $LiNiO_2$, $LiMnO_2$ and $LiMn_2O_4$; those in which a plurality of transition metals are mixed in the above lithium-containing transition metal composite oxides; those in which transition metals of the above lithium-containing transition metal composite oxides are partially replaced with any metals other than transition metals; phosphoric acid compounds of transition metals, called olivines, such as $LiFePO_4$, $LiCoPO_4$ and $LiMnPO_4$; oxides such as $TiO_2$, $V_2O_5$ and $MoO_3$; sulfides such as $TiS_2$ and FeS; conductive polymers such as polyacetylene, polyparaphenylene, polyaniline and polypyrrole; activated carbons; polymers capable of generating radicals; and carbon materials.

A conductive agent such as acetylene black, ketjen black, carbon fibers or graphite and a binder such as polytetrafluoroethylene, polyvinylidene fluoride or SBR resin are added to the positive and negative electrode materials. The resulting electrode material compositions can be each formed into a sheet shape and provided as electrode sheets.

As a separator to prevent contact between the positive electrode and the negative electrode, there can be used a nonwoven fabric or porous sheet of polypropylene, polyethylene, paper, glass fibers or the like.

Using the above battery components, the electrochemical device is assembled as a coin type, cylindrical type, rectangular type or aluminum laminate type battery.

EXAMPLES

The present invention will be described in more detail below by way of the following examples. These examples are however not intended to limit the present invention thereto.

<Preparation of Electrolytic Solutions No. 1-1 to 1-58 and Comparative Electrolytic Solutions No. 1-1 to 1-43>

Each electrolytic solution was prepared by the following procedure using, as a nonaqueous solvent, a mixed solvent of ethylene carbonate (hereinafter referred to as "EC"), propylene carbonate (hereinafter referred to as "PC"), dimethyl carbonate (hereinafter referred to as "DMC") and ethyl methyl carbonate (hereinafter referred to as "EMC") at a volume ratio of 2:1:3:4.

(Electrolytic Solutions No. 1-1 to 1-41 and Comparative Electrolytic Solutions No. 1-1 to 1-18)
The electrolytic solutions No. 1-1 to 1-41 and the comparative electrolytic solutions No. 1-1 to 1-18 were each prepared by dissolving, in the above mixed solvent, 1.0 mol/L of lithium hexafluorophosphate (hereinafter referred to as "$LiPF_6$") as a solute and further dissolving predetermined amounts of the components (I) and (II) and, optionally the other additive, as shown in TABLES 1 and 3.

(Electrolytic Solutions No. 1-42 to 1-44)
The electrolytic solutions No. 1-42 to 1-44 were each prepared by dissolving, as a solute, 1.0 mol/L of $LiPF_6$ and 0.10 mol/L of lithium bis(trifluoromethanesulfonyl)imide (hereinafter referred to as "$LiN(CF_3SO_2)_2$") in the above mixed solvent and further dissolving predetermined amounts of the components (I) and (II) as shown in TABLE 2.

(Electrolytic Solutions No. 1-45 to 1-47)
The electrolytic solutions No. 1-45 to 1-47 were each prepared by dissolving, as a solute, 1.0 mol/L of $LiPF_6$ and 0.10 mol/L of lithium bis(fluorosulfonyl)imide (hereinafter referred to as "$LiN(FSO_2)_2$") in the above mixed solvent and further dissolving predetermined amounts of the components (I) and (II) as shown in TABLE 2.

(Electrolytic Solutions No. 1-48 to 1-50)
The electrolytic solutions No. 1-48 to 1-50 were each prepared by dissolving, as a solute, 1.0 mol/L of $LiPF_6$ and 0.10 mol/L of lithium difluorophosphate (hereinafter referred to as "$LiPO_2F_2$") in the above mixed solvent and further dissolving predetermined amounts of the components (I) and (II) as shown in TABLE 2.

(Electrolytic Solutions No. 1-51 to 1-53)
The electrolytic solutions No. 1-51 to 1-53 were each prepared by dissolving, as a solute, 1.0 mol/L of $LiPF_6$ and 0.10 mol/L of lithium bis(fluorosulfonyl)imide (hereinafter referred to as "$LiN(FSO_2)_2$") in the above mixed solvent and further dissolving predetermined amounts of the components (I) and (II) as shown in TABLE 2.

(Electrolytic Solutions No. 1-54 to 1-56)
The electrolytic solutions No. 1-54 to 1-56 were each prepared by dissolving, as a solute, 1.0 mol/L of $LiPF_6$ and 0.10 mol/L of lithium difluorophosphate (hereinafter referred to as "$LiPO_2F_2$") in the above mixed solvent and further dissolving predetermined amounts of the components (I) and (II) as shown in TABLE 2.

(Electrolytic Solution No. 1-57)
The electrolytic solution No. 1-57 was prepared by dissolving, as a solute, 1.0 mol/L of $LiPF_6$, 0.10 mol/L of $LiPO_2F_2$ and 0.025 mol/L of lithium tetrafluoroborate (hereinafter referred to as "$LiBF_4$") in the above mixed solvent and further dissolving predetermined amounts of the components (I) and (II) as shown in TABLE 2.

(Electrolytic Solution No. 1-58)
The electrolytic solution No. 1-58 was prepared by dissolving, as a solute, 1.0 mol/L of $LiPF_6$, 0.10 mol/L of $LiN(FSO_2)_2$, 0.10 mol/L of $LiPO_2F_2$ and 0.025 mol/L of $LiBF_4$ in the above mixed solvent and further dissolving predetermined amounts of the components (I) and (II) as shown in TABLE 2.

(Comparative Electrolytic Solution No. 1-19)
The comparative electrolytic solution No. 1-19 was prepared in the same manner as the electrolytic solution No. 1-42 except that the components (I) and (II) and the other additive were not contained as shown in TABLE 3.

(Comparative Electrolytic Solutions No. 1-20 and 1-21)
The comparative electrolytic solutions No. 1-20 and 1-21 were prepared in the same manner as the electrolytic solutions No. 1-42 and 1-43, respectively, except that the component (II) was not contained as shown in TABLE 3.

(Comparative Electrolytic Solutions No. 1-22 and 1-23)
The comparative electrolytic solutions No. 1-22 and 1-23 were prepared in the same manner as the electrolytic solutions No. 1-42 and 1-44, respectively, except that the component (I) was not contained as shown in TABLE 3.

(Comparative Electrolytic Solution No. 1-24)
The comparative electrolytic solution No. 1-24 was prepared in the same manner as the electrolytic solution No. 1-45 except that the components (I) and (II) and the other additive were not contained as shown in TABLE 3.

(Comparative Electrolytic Solutions No. 1-25 and 1-26)
The comparative electrolytic solutions No. 1-25 and 1-26 were prepared in the same manner as the electrolytic solutions No. 1-45 and 1-46, respectively, except that the component (II) was not contained as shown in TABLE 3.

(Comparative Electrolytic Solutions No. 1-27 and 1-28)

The comparative electrolytic solutions No. 1-27 and 1-28 were prepared in the same manner as the electrolytic solutions No. 1-45 and 1-47, respectively, except that the component (I) was not contained as shown in TABLE 3.

(Comparative Electrolytic Solution No. 1-29)

The comparative electrolytic solution No. 1-29 was prepared in the same manner as the electrolytic solution No. 1-48 except that the components (I) and (II) and the other additive were not contained as shown in TABLE 3.

(Comparative Electrolytic Solutions No. 1-30 and 1-31)

The comparative electrolytic solutions No. 1-30 and 1-31 were prepared in the same manner as the electrolytic solutions No. 1-48 and 1-49, respectively, except that the component (II) was not contained as shown in TABLE 3.

(Comparative Electrolytic Solutions No. 1-32 and 1-33)

The comparative electrolytic solutions No. 1-32 and 1-33 were prepared in the same manner as the electrolytic solutions No. 1-48 and 1-50, respectively, except that the component (I) was not contained as shown in TABLE 3.

(Comparative Electrolytic Solutions No. 1-34 and 1-35)

The comparative electrolytic solutions No. 1-34 and 1-35 were prepared in the same manner as the electrolytic solutions No. 1-51 and 1-53, respectively, except that the component (I) was not contained as shown in TABLE 3.

(Comparative Electrolytic Solutions No. 1-36 and 1-37)

The comparative electrolytic solutions No. 1-36 and 1-37 were prepared in the same manner as the electrolytic solutions No. 1-54 and 1-56, respectively, except that the component (I) was not contained as shown in TABLE 3.

(Comparative Electrolytic Solutions No. 1-38 to 1-40)

The comparative electrolytic solution No. 1-38 was prepared in the same manner as the electrolytic solution No. 1-57 except that the components (I) and (II) were not contained as shown in TABLE 3.

The comparative electrolytic solution No. 1-39 was prepared in the same manner as the electrolytic solution No. 1-57 except that the component (II) was not contained as shown in TABLE 3.

The comparative electrolytic solution No. 1-40 was prepared in the same manner as the electrolytic solution No. 1-57 except that the component (I) was not contained as shown in TABLE 3.

(Comparative Electrolytic Solutions No. 1-41 to 1-43)

The comparative electrolytic solution No. 1-41 was prepared in the same manner as the electrolytic solution No. 1-58 except that the components (I) and (II) were not contained as shown in TABLE 3.

The comparative electrolytic solution No. 1-42 was prepared in the same manner as the electrolytic solution No. 1-58 except that the component (II) was not contained as shown in TABLE 3.

The comparative electrolytic solution No. 1-43 was prepared in the same manner as the electrolytic solution No. 1-58 except that the component (I) was not contained as shown in TABLE 3.

The preparation of the above electrolytic solutions were carried out by maintaining the solution temperature at 25° C.

In the respective table, 1,3-PRS refers to 1,3-propene sultone; 1,4-BTS refers to 1,4-butene sultone; TFBTS refers to 1,1,1-trifluoro-2,4-butene sultone; 4,5-DFEC refers to 4,5-difluoroethylene carbonate; 1,2-ES refers to 1,2-ethylene sulfate, that is, the above compound No. 4-1; and 1,3-PS refers to 1,3-propane sultone.

In the preparation of the comparative electrolytic solutions No. 1-15 to 1-18, the following compounds No. 1-26 to 1-29 were used in place of the component (I).

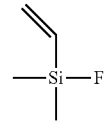

Compound No. 1-26

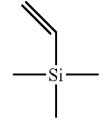

Compound No. 1-27

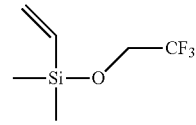

Compound No. 1-28

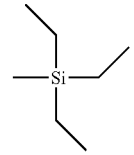

Compound No. 1-29

<Formation of NCM Positive Electrodes>

A powder of $LiNi_{1/3}Co_{1/3}Mn_{1/3}O_2$ (NCM) as a positive electrode material and acetylene black (as a conductive agent) mixed together by dry mixing. The resulting mixture was uniformly dispersed and mixed into N-methyl-2-pyrrolidone (hereinafter referred to as "NMP") in which polyvinylidene fluoride (hereinafter referred to as "PVDF") as a binder had previously been dissolved, followed by adding thereto NMP for viscosity control. There was thus obtained a NCM composition paste. Then, NMC positive electrodes for testing were each prepared by applying the thus-obtained paste to an aluminum foil (as a collector), drying and pressuring the applied paste and cutting the resulting electrode sheet into a predetermined size. The positive electrodes had a solid matter ratio of NCM:conductive agent: PVDF=85:5:10 (in terms of mass ratio).

<Formation of Graphite Negative Electrodes>

A powder of graphite as a negative electrode material was uniformly dispersed and mixed into NMP in which PVDF as a binder had previously been dissolved, followed by adding thereto NMP for viscosity control. There was thus obtained a graphite composition paste. Then, graphite negative electrodes for testing were each prepared by applying the thus-obtained paste to a copper foil (as a collector), drying and pressuring the applied paste and cutting the resulting electrode sheet into a predetermined size. The negative electrodes had a solid matter ratio of graphite powder: PVDF=90:10 (in terms of mass ratio).

<Production of Nonaqueous Electrolyte Batteries>

Nonaqueous electrolyte batteries of Examples 1-1 to 1-58 and Comparative Examples 1-1 to 1-43 were respectively produced by impregnating aluminum laminate-packed cells (capacity 30 mAh), each of which was provided with the above-formed NCM positive electrode, the above-formed graphite negative electrode and a separator of cellulose, with the electrolytic solutions No. 1-1 to 1-58 and the comparative electrolytic solutions No. 1-1 to 1-43 listed in TABLES 1 to 3.

TABLE 1

| | (I) Kind (Comp. No.) | (I) Mass % | (II) Kind | (II) Mass % | Other Additive Kind | Other Additive Mass % |
|---|---|---|---|---|---|---|
| Elec. Soln. No. 1-1 | No. 1-2 | 0.005 | 1,3-PRS | 1.0 | None | |
| Elec. Soln. No. 1-2 | | 0.01 | | 1.0 | | |
| Elec. Soln. No. 1-3 | | 0.05 | | 1.0 | | |
| Elec. Soln. No. 1-4 | | 0.1 | | 1.0 | | |
| Elec. Soln. No. 1-5 | | 0.5 | | 1.0 | | |
| Elec. Soln. No. 1-6 | | 2.0 | | 1.0 | | |
| Elec. Soln. No. 1-7 | | 5.0 | | 1.0 | | |
| Elec. Soln. No. 1-8 | | 10.0 | | 1.0 | | |
| Elec. Soln. No. 1-9 | No. 1-2 | 0.5 | 1,3-PRS | 0.05 | | |
| Elec. Soln. No. 1-10 | | 0.5 | | 0.1 | | |
| Elec. Soln. No. 1-11 | | 0.5 | | 2.0 | | |
| Elec. Soln. No. 1-12 | | 0.5 | | 3.0 | | |
| Elec. Soln. No. 1-13 | No. 1-1 | 0.5 | 1,3-PRS | 1.0 | | |
| Elec. Soln. No. 1-14 | No. 1-3 | 0.5 | | 1.0 | | |
| Elec. Soln. No. 1-15 | No. 1-4 | 0.5 | | 1.0 | | |
| Elec. Soln. No. 1-16 | No. 1-5 | 0.5 | | 1.0 | | |
| Elec. Soln. No. 1-17 | No. 1-6 | 0.5 | | 1.0 | | |
| Elec. Soln. No. 1-18 | No. 1-7 | 0.5 | | 1.0 | | |
| Elec. Soln. No. 1-19 | No. 1-8 | 0.5 | | 1.0 | | |
| Elec. Soln. No. 1-20 | No. 1-9 | 0.5 | | 1.0 | | |
| Elec. Soln. No. 1-21 | No. 1-10 | 0.5 | | 1.0 | | |
| Elec. Soln. No. 1-22 | No. 1-11 | 0.5 | | 1.0 | | |
| Elec. Soln. No. 1-23 | No. 1-12 | 0.5 | | 1.0 | | |
| Elec. Soln. No. 1-24 | No. 1-13 | 0.5 | | 1.0 | | |
| Elec. Soln. No. 1-25 | No. 1-14 | 0.5 | | 1.0 | | |
| Elec. Soln. No. 1-26 | No. 1-15 | 0.5 | | 1.0 | | |
| Elec. Soln. No. 1-27 | No. 1-16 | 0.5 | | 1.0 | | |
| Elec. Soln. No. 1-28 | No. 1-17 | 0.5 | | 1.0 | | |
| Elec. Soln. No. 1-29 | No. 1-18 | 0.5 | | 1.0 | | |
| Elec. Soln. No. 1-30 | No. 1-19 | 0.5 | | 1.0 | | |
| Elec. Soln. No. 1-31 | No. 1-20 | 0.5 | | 1.0 | | |
| Elec. Soln. No. 1-32 | No. 1-21 | 0.5 | | 1.0 | | |
| Elec. Soln. No. 1-33 | No. 1-22 | 0.5 | | 1.0 | | |
| Elec. Soln. No. 1-34 | No. 1-23 | 0.5 | | 1.0 | | |
| Elec. Soln. No. 1-35 | No. 1-24 | 0.5 | | 1.0 | | |
| Elec. Soln. No. 1-36 | No. 1-25 | 0.5 | | 1.0 | | |
| Elec. Soln. No. 1-37 | No. 1-2 | 0.5 | 1,4-BTS | 1.0 | | |
| Elec. Soln. No. 1-38 | No. 1-2 | 0.5 | TFBTS | 1.0 | | |
| Elec. Soln. No. 1-39 | No. 1-2 | 0.5 | 1,3-PRS / 1,4-BTS | 0.5 / 0.5 | | |
| Elec. Soln. No. 1-40 | No. 1-6 | 0.5 | 1,3-PRS / 1,2-ES | 0.5 / 0.5 | | |
| Elec. Soln. No. 1-41 | No. 1-2 | 0.5 | 1,3-PRS | 0.5 | 4,5-DFEC | 1.0 |

TABLE 2

| | (I) Kind (Comp. No.) | (I) Mass % | (II) Kind (Comp. No.) | (II) Mass % | Other Additive Kind (Comp. No.) | Other Additive Mass % |
|---|---|---|---|---|---|---|
| Elec. Soln. No. 1-42 | No. 1-2 | 0.5 | 1,3-PS / 1,2-ES | 0.5 / 0.5 | None | |
| Elec. Soln. No. 1-43 | No. 1-6 | 0.5 | 1,3-PS / 1,2-ES | 0.5 / 0.5 | | |
| Elec. Soln. No. 1-44 | No. 1-6 | 0.5 | 1,3-PRS / 1,2-ES | 0.5 / 0.5 | | |
| Elec. Soln. No. 1-45 | No. 1-2 | 0.5 | 1,3-PS / 1,2-ES | 0.5 / 0.5 | | |
| Elec. Soln. No. 1-46 | No. 1-6 | 0.5 | 1,3-PS / 1,2-ES | 0.5 / 0.5 | | |
| Elec. Soln. No. 1-47 | No. 1-6 | 0.5 | 1,3-PRS / 1,2-ES | 0.5 / 0.5 | | |
| Elec. Soln. No. 1-48 | No. 1-2 | 0.5 | 1,3-PS / 1,2-ES | 0.5 / 0.5 | | |
| Elec. Soln. No. 1-49 | No. 1-6 | 0.5 | 1,3-PS / 1,2-ES | 0.5 / 0.5 | | |
| Elec. Soln. No. 1-50 | No. 1-6 | 0.5 | 1,3-PRS / 1,2-ES | 0.5 / 0.5 | | |
| Elec. Soln. No. 1-51 | No. 1-2 | 0.5 | 1,3-PS / No. 5-1 | 0.5 / 0.5 | | |
| Elec. Soln. No. 1-52 | No. 1-6 | 0.5 | 1,3-PS / No. 5-1 | 0.5 / 0.5 | | |
| Elec. Soln. No. 1-53 | No. 1-6 | 0.5 | 1,3-PRS / No. 5-1 | 0.5 / 0.5 | | |
| Elec. Soln. No. 1-54 | No. 1-2 | 0.5 | 1,3-PS / No. 5-1 | 0.5 / 0.5 | | |
| Elec. Soln. No. 1-55 | No. 1-6 | 0.5 | 1,3-PS / No. 5-1 | 0.5 / 0.5 | | |
| Elec. Soln. No. 1-56 | No. 1-6 | 0.5 | 1,3-PRS / No. 5-1 | 0.5 / 0.5 | | |
| Elec. Soln. No. 1-57 | No. 1-6 | 0.5 | 1,3-PS / 1,2-ES | 0.5 / 0.5 | No. V-12 | 2.0 |
| Elec. Soln. No. 1-58 | No. 1-6 | 0.5 | 1,3-PS / 1,2-ES | 0.5 / 0.5 | No. V-2 | 4.0 |

TABLE 3

| | (I) Kind (Comp. No.) | (I) Mass % | (II) Kind (Comp. No.) | (II) Mass % | Other Additive Kind (Comp. No.) | Other Additive Mass % |
|---|---|---|---|---|---|---|
| Comp. Elec. Soln. No. 1-1 | None | | None | | None | |
| Comp. Elec. Soln. No. 1-2 | No. 1-1 | 0.5 | None | | | |
| Comp. Elec. Soln. No. 1-3 | No. 1-2 | 0.5 | | | | |
| Comp. Elec. Soln. No. 1-4 | No. 1-6 | 0.5 | | | | |
| Comp. Elec. Soln. No. 1-5 | No. 1-11 | 0.5 | | | | |
| Comp. Elec. Soln. No. 1-6 | No. 1-16 | 0.5 | | | | |
| Comp. Elec. Soln. No. 1-7 | No. 1-20 | 0.5 | | | | |
| Comp. Elec. Soln. No. 1-8 | No. 1-21 | 0.5 | | | | |
| Comp. Elec. Soln. No. 1-9 | No. 1-22 | 0.5 | | | | |
| Comp. Elec. Soln. No. 1-10 | None | | 1,3-PRS | 1.0 | | |
| Comp. Elec. Soln. No. 1-11 | | | 1,4-BTS | 1.0 | | |
| Comp. Elec. Soln. No. 1-12 | | | TFBTS | 1.0 | | |
| Comp. Elec. Soln. No. 1-13 | | | 1,3-PRS / 1,2-ES | 0.5 / 0.5 | | |
| Comp. Elec. Soln. No. 1-14 | None | | 1,3-PRS | 0.5 | 4,5-DFEC | 1.0 |
| Comp. Elec. Soln. No. 1-15 | No. 1-26 | 0.5 | 1,3-PRS | 1.0 | None | |
| Comp. Elec. Soln. No. 1-16 | No. 1-27 | 0.5 | | 1.0 | | |
| Comp. Elec. Soln. No. 1-17 | No. 1-28 | 0.5 | | 1.0 | | |
| Comp. Elec. Soln. No. 1-18 | No. 1-29 | 0.5 | | 1.0 | | |
| Comp. Elec. Soln. No. 1-19 | None | | None | | None | |
| Comp. Elec. Soln. No. 1-20 | No. 1-2 | 0.5 | None | | | |
| Comp. Elec. Soln. No. 1-21 | No. 1-6 | 0.5 | None | | | |

TABLE 3-continued

| | (I) | | (II) | | Other Additive | |
|---|---|---|---|---|---|---|
| | Kind (Comp. No.) | Mass % | Kind (Comp. No.) | Mass % | Kind (Comp. No.) | Mass % |
| Comp. Elec. Soln. No. 1-22 | None | | 1,3-PS 1,2-ES | 0.5 0.5 | | |
| Comp. Elec. Soln. No. 1-23 | None | | 1,3-PRS 1,2-ES | 0.5 0.5 | | |
| Comp. Elec. Soln. No. 1-24 | None | | None | | | |
| Comp. Elec. Soln. No. 1-25 | No. 1-2 | 0.5 | None | | | |
| Comp. Elec. Soln. No. 1-26 | No. 1-6 | 0.5 | None | | | |
| Comp. Elec. Soln. No. 1-27 | None | | 1,3-PS 1,2-ES | 0.5 0.5 | | |
| Comp. Elec. Soln. No. 1-28 | None | | 1,3-PRS 1,2-ES | 0.5 0.5 | | |
| Comp. Elec. Soln. No. 1-29 | None | | None | | | |
| Comp. Elec. Soln. No. 1-30 | No. 1-2 | 0.5 | None | | | |
| Comp. Elec. Soln. No. 1-31 | No. 1-6 | 0.5 | None | | | |
| Comp. Elec. Soln. No. 1-32 | None | | 1,3-PS 1,2-ES | 0.5 0.5 | | |
| Comp. Elec. Soln. No. 1-33 | None | | 1,3-PRS 1,2-ES | 0.5 0.5 | | |
| Comp. Elec. Soln. No. 1-34 | None | | 1,3-PS No. 5-1 | 0.5 0.5 | | |
| Comp. Elec. Soln. No. 1-35 | None | | 1,3-PRS No. 5-1 | 0.5 0.5 | | |
| Comp. Elec. Soln. No. 1-36 | None | | 1,3-PS No. 5-1 | 0.5 0.5 | | |
| Comp. Elec. Soln. No. 1-37 | None | | 1,3-PRS No. 5-1 | 0.5 0.5 | | |
| Comp. Elec. Soln. No. 1-38 | None | | None | | No. V-12 | 2.0 |
| Comp. Elec. Soln. No. 1-39 | No. 1-6 | 0.5 | None | | No. V-12 | 2.0 |
| Comp. Elec. Soln. No. 1-40 | None | | 1,3-PS 1,2-ES | 0.5 0.5 | No. V-12 | 2.0 |
| Comp. Elec. Soln. No. 1-41 | None | | None | | No. V-2 | 4.0 |
| Comp. Elec. Soln. No. 1-42 | No. 1-6 | 0.5 | None | | No. V-2 | 4.0 |
| Comp. Elec. Soln. No. 1-43 | None | | 1,3-PS 1,2-ES | 0.5 0.5 | No. V-2 | 4.0 |

Examples 1-1 to 1-58 and Comparative Examples 1-1 to 1-43

Evaluations of Nonaqueous Electrolyte Batteries
<Evaluation 1> High-temperature storage characteristics (70° C.)

The following evaluation was performed on each of the nonaqueous electrolyte batteries of Examples 1-1 to 1-58 and Comparative Examples 1-1 to 1-43.

First, the above-obtained cell was subjected to conditioning treatment under the following conditions at an ambient temperature of 25° C. The cell was initially charged by constant-current constant-voltage charging with a charging upper limit voltage of 4.3 V at a 0.1 C rate (3 mA). Subsequently, the cell was discharged to a discharge termination voltage of 3.0 V by constant-current discharging at a 0.2 C rate (6 mA). After that, the cell was subjected to three cycles of constant-current constant-voltage charging with a charging upper limit voltage of 4.3 V at a 0.2 C rate (6 mA) and constant-current discharging to a discharge termination voltage of 3.0 V at a 0.2 C rate (6 mA).

After the above conditioning treatment, the cell was charged by constant-current constant-voltage charging with a charging upper limit voltage of 4.3 V at a 0.2 C rate (6 mA) under an ambient temperature of 25° C., stored under an ambient temperature of 70° C. for 10 days, and then, discharged to a discharge termination voltage of 3.0 V by constant-current discharging at a 0.2 C rate (6 mA). The ratio of a discharge capacity of the cell at this point of time to an initial discharge capacity of the cell (measured before the storage at 70° C. after the conditioning treatment) was determined as a remaining capacity ratio for evaluation of the cell storage characteristics (discharge capacity retention rate after the storage at 70° C.).

In TABLES 4 and 5, the remaining capacity ratios of Examples 1-1 to 1-41 and Comparative Examples 1-1 to 1-18 are each indicated as a relative value, called "discharge capacity retention rate after the storage at 70° C.", assuming the remaining capacity ratio of Comparative Example 1-1 as 100.

The remaining capacity ratios of Examples 1-42 to 1-44 and Comparative Examples 1-19 to 1-23 are each indicated as a relative value, called "discharge capacity retention rate after the storage at 70° C.", assuming the remaining capacity ratio of Comparative Example 1-19 as 100.

The remaining capacity ratios of Examples 1-45 to 1-47 and Comparative Examples 1-24 to 1-28 are each indicated as a relative value, called "discharge capacity retention rate after the storage at 70° C.", assuming the remaining capacity ratio of Comparative Example 1-24 as 100.

The remaining capacity ratios of Examples 1-48 to 1-50 and Comparative Examples 1-29 to 1-33 are each indicated as a relative value, called "discharge capacity retention rate after the storage at 70° C.", assuming the remaining capacity ratio of Comparative Example 1-29 as 100.

The remaining capacity ratios of Examples 1-51 to 1-53 and Comparative Examples 1-34 to 1-35 are each indicated as a relative value, called "discharge capacity retention rate after the storage at 70° C.", assuming the remaining capacity ratio of Comparative Example 1-24 as 100.

The remaining capacity ratios of Examples 1-54 to 1-56 and Comparative Examples 1-36 to 1-37 are each indicated as a relative value, called "discharge capacity retention rate after the storage at 70° C.", assuming the remaining capacity ratio of Comparative Example 1-29 as 100.

The remaining capacity ratios of Example 1-57 and Comparative Examples 1-38 to 1-40 are each indicated as a relative value, called "discharge capacity retention rate after the storage at 70° C.", assuming the remaining capacity ratio of Comparative Example 1-38 as 100.

The remaining capacity ratios of Example 1-58 and Comparative Examples 1-41 to 1-43 are each indicated as a relative value, called "discharge capacity retention rate after the storage at 70° C.", assuming the remaining capacity ratio of Comparative Example 1-41 as 100.

<Evaluation 2> Gas generation amount during high-temperature storage (70° C.)

The volume of the battery was measured after the battery was subjected to the conditioning treatment and stored at 70° C. for 10 days as mentioned above. A difference between the battery volume measurement results before and after the storage was determined as a gas generation amount.

In TABLES 4 and 5, the gas generation amounts of Examples 1-1 to 1-41 and Comparative Examples 1-1 to 1-18 are indicated as relative values assuming the gas generation amount of Comparative Example 1-1 as 100.

The gas generation amounts of Examples 1-42 to 1-44 and Comparative Examples 1-19 to 1-23 are indicated as relative values assuming the gas generation amount of Comparative Example 1-19 as 100.

The gas generation amounts of Examples 1-45 to 1-47 and Comparative Examples 1-24 to 1-28 are indicated as relative values assuming the gas generation amount of Comparative Example 1-24 as 100.

The gas generation amounts of Examples 1-48 to 1-50 and Comparative Examples 1-29 to 1-33 are indicated as relative values assuming the gas generation amount of Comparative Example 1-29 as 100.

The gas generation amounts of Examples 1-51 to 1-53 and Comparative Examples 1-34 to 1-35 are indicated as relative values assuming the gas generation amount of Comparative Example 1-24 as 100.

The gas generation amounts of Examples 1-54 to 1-56 and Comparative Examples 1-36 to 1-37 are indicated as relative values assuming the gas generation amount of Comparative Example 1-29 as 100.

The gas generation amounts of Example 1-57 and Comparative Examples 1-38 to 1-40 are indicated as relative values assuming the gas generation amount of Comparative Example 1-38 as 100.

The gas generation amounts of Example 1-58 and Comparative Examples 1-41 to 1-43 are indicated as relative values assuming the gas generation amount of Comparative Example 1-41 as 100.

TABLE 4

| | Elec. Soln. No. | Positive Electrode Material | Negative Electrode Material | Discharge Capacity Retention Rate After Storage at 70° C. | Gas Generation Amount After Storage at 70° C. |
|---|---|---|---|---|---|
| Ex. 1-1 | Elec. Soln. No. 1-1 | $LiNi_{1/3}Co_{1/3}Mn_{1/3}O_2$ | Graphite | 117 | 88 |
| Ex. 1-2 | Elec. Soln. No. 1-2 | | | 118 | 88 |
| Ex. 1-3 | Elec. Soln. No. 1-3 | | | 120 | 85 |
| Ex. 1-4 | Elec. Soln. No. 1-4 | | | 128 | 82 |
| Ex. 1-5 | Elec. Soln. No. 1-5 | | | 134 | 75 |
| Ex. 1-6 | Elec. Soln. No. 1-6 | | | 133 | 77 |
| Ex. 1-7 | Elec. Soln. No. 1-7 | | | 132 | 79 |
| Ex. 1-8 | Elec. Soln. No. 1-8 | | | 130 | 80 |
| Ex. 1-9 | Elec. Soln. No. 1-9 | | | 117 | 88 |
| Ex. 1-10 | Elec. Soln. No. 1-10 | | | 120 | 85 |
| Ex. 1-11 | Elec. Soln. No. 1-11 | | | 134 | 80 |
| Ex. 1-12 | Elec. Soln. No. 1-12 | | | 135 | 81 |
| Ex. 1-13 | Elec. Soln. No. 1-13 | | | 128 | 81 |
| Ex. 1-14 | Elec. Soln. No. 1-14 | | | 120 | 85 |
| Ex. 1-15 | Elec. Soln. No. 1-15 | | | 124 | 83 |
| Ex. 1-16 | Elec. Soln. No. 1-16 | | | 128 | 78 |
| Ex. 1-17 | Elec. Soln. No. 1-17 | | | 129 | 77 |
| Ex. 1-18 | Elec. Soln. No. 1-18 | | | 126 | 80 |
| Ex. 1-19 | Elec. Soln. No. 1-19 | | | 127 | 78 |
| Ex. 1-20 | Elec. Soln. No. 1-20 | | | 128 | 80 |
| Ex. 1-21 | Elec. Soln. No. 1-21 | | | 126 | 81 |
| Ex. 1-22 | Elec. Soln. No. 1-22 | | | 173 | 82 |
| Ex. 1-23 | Elec. Soln. No. 1-23 | | | 125 | 80 |
| Ex. 1-24 | Elec. Soln. No. 1-24 | | | 121 | 82 |
| Ex. 1-25 | Elec. Soln. No. 1-25 | | | 120 | 83 |
| Ex. 1-26 | Elec. Soln. No. 1-26 | | | 122 | 81 |
| Ex. 1-27 | Elec. Soln. No. 1-27 | | | 132 | 76 |
| Ex. 1-28 | Elec. Soln. No. 1-28 | | | 130 | 80 |
| Ex. 1-29 | Elec. Soln. No. 1-29 | | | 122 | 85 |
| Ex. 1-30 | Elec. Sole. No. 1-30 | | | 120 | 84 |
| Ex. 1-31 | Elec. Soln. No. 1-31 | | | 128 | 82 |
| Ex. 1-32 | Elec. Soln. No. 1-32 | | | 130 | 79 |
| Ex. 1-33 | Elec. Soln. No. 1-33 | | | 129 | 80 |
| Ex. 1-34 | Elec. Soln. No. 1-34 | | | 121 | 83 |
| Ex. 1-35 | Elec. Soln. No. 1-35 | | | 122 | 83 |
| Ex. 1-36 | Elec. Soln. No. 1-36 | | | 126 | 82 |
| Ex. 1-37 | Elec. Soln. No. 1-37 | | | 133 | 74 |
| Ex. 1-38 | Elec. Soln. No. 1-38 | | | 125 | 81 |
| Ex. 1-39 | Elec. Soln. No. 1-39 | | | 135 | 75 |
| Ex. 1-40 | Elec. Soln. No. 1-40 | | | 130 | 76 |
| Ex. 1-41 | Elec. Soln. No. 1-41 | | | 136 | 75 |
| Ex. 1-42 | Elec. Soln. No. 1-42 | | | 133 | 75 |
| Ex. 1-43 | Elec. Soln. No. 1-43 | | | 132 | 75 |
| Ex. 1-44 | Elec. Soln. No. 1-44 | | | 129 | 77 |
| Ex. 1-45 | Elec. Soln. No. 1-45 | | | 127 | 79 |
| Ex. 1-46 | Elec. Soln. No. 1-46 | | | 125 | 80 |
| Ex. 1-47 | Elec. Soln. No. 1-47 | | | 124 | 81 |
| Ex. 1-48 | Elec. Soln. No. 1-48 | | | 132 | 78 |
| Ex. 1-49 | Elec. Soln. No. 1-49 | | | 127 | 77 |
| Ex. 1-50 | Elec. Soln. No. 1-50 | | | 126 | 79 |

TABLE 5

| Elec. Soln. No. | | Positive Electrode Material | Negative Electrode Material | Discharge Capacity Retention Rate After Storage at 70° C. | Gas Generation Amount After Storage at 70° C. |
|---|---|---|---|---|---|
| Ex. 1-51 | Elec. Soln. No. 1-51 | LiNi$_{1/3}$Co$_{1/3}$Mn$_{1/3}$O$_2$ | Graphite | 124 | 81 |
| Ex. 1-52 | Elec. Soln. No. 1-52 | | | 124 | 81 |
| Ex. 1-53 | Elec. Soln. No. 1-53 | | | 121 | 82 |
| Ex. 1-54 | Elec. Soln. No. 1-54 | | | 129 | 80 |
| Ex. 1-55 | Elec. Soln. No. 1-55 | | | 125 | 80 |
| Ex. 1-56 | Elec. Soln. No. 1-56 | | | 124 | 81 |
| Ex. 1-57 | Elec. Soln. No. 1-57 | | | 130 | 75 |
| Ex. 1-58 | Elec. Soln. No. 1-58 | | | 128 | 78 |
| Comp. Ex. 1-1 | Comp. Elec. Soln. No. 1-1 | | | 100 | 100 |
| Comp. Ex. 1-2 | Comp. Elec. Soln. No. 1-2 | | | 111 | 90 |
| Comp. Ex. 1-3 | Comp. Elec. Soln. No. 1-3 | | | 108 | 94 |
| Comp. Ex. 1-4 | Comp. Elec. Soln. No. 1-4 | | | 109 | 93 |
| Comp. Ex. 1-5 | Comp. Elec. Soln. No. 1-5 | | | 115 | 89 |
| Comp. Ex. 1-6 | Comp. Elec. Soln. No. 1-6 | | | 113 | 90 |
| Comp. Ex. 1-7 | Comp. Elec. Soln. No. 1-7 | | | 109 | 95 |
| Comp. Ex. 1-8 | Comp. Elec. Soln. No. 1-8 | | | 112 | 92 |
| Comp. Ex. 1-9 | Comp. Elec. Soln. No. 1-9 | | | 110 | 93 |
| Comp. Ex. 1-10 | Comp. Elec. Soln. No. 1-10 | | | 116 | 106 |
| Comp. Ex. 1-11 | Comp. Elec. Soln. No. 1-11 | | | 115 | 104 |
| Comp. Ex. 1-12 | Comp. Elec. Soln. No. 1-12 | | | 115 | 105 |
| Comp. Ex. 1-13 | Comp. Elec. Soln. No. 1-13 | | | 117 | 107 |
| Comp. Ex. 1-14 | Comp. Elec. Soln. No. 1-14 | | | 117 | 104 |
| Comp. Ex. 1-15 | Comp. Elec. Soln. No. 1-15 | | | 99 | 110 |
| Comp. Ex. 1-16 | Comp. Elec. Soln. No. 1-16 | | | 98 | 112 |
| Comp. Ex. 1-17 | Comp. Elec. Soln. No. 1-17 | | | 100 | 109 |
| Comp. Ex. 1-18 | Comp. Elec. Soln. No. 1-18 | | | 95 | 110 |
| Comp. Ex. 1-19 | Comp. Elec. Soln. No. 1-19 | | | 100 | 100 |
| Comp. Ex. 1-20 | Comp. Elec. Soln. No. 1-20 | | | 107 | 95 |
| Comp. Ex. 1-21 | Comp. Elec. Soln. No. 1-21 | | | 109 | 94 |
| Comp. Ex. 1-22 | Comp. Elec. Soln. No. 1-22 | | | 117 | 106 |
| Comp. Ex. 1-23 | Comp. Elec. Soln. No. 1-23 | | | 116 | 107 |
| Comp. Ex. 1-24 | Comp. Elec. Soln. No. 1-24 | | | 100 | 100 |
| Comp. Ex. 1-25 | Comp. Elec. Soln. No. 1-25 | | | 106 | 97 |
| Comp. Ex. 1-26 | Comp. Elec. Soln. No. 1-26 | | | 107 | 96 |
| Comp. Ex. 1-27 | Comp. Elec. Soln. No. 1-27 | | | 112 | 104 |
| Comp. Ex. 1-28 | Comp. Elec. Soln. No. 1-28 | | | 110 | 105 |
| Comp. Ex. 1-29 | Comp. Elec. Soln. No. 1-29 | | | 100 | 100 |
| Comp. Ex. 1-30 | Comp. Elec. Soln. No. 1-30 | | | 104 | 95 |
| Comp. Ex. 1-31 | Comp. Elec. Soln. No. 1-31 | | | 106 | 93 |
| Comp. Ex. 1-32 | Comp. Elec. Soln. No. 1-32 | | | 113 | 105 |
| Comp. Ex. 1-33 | Comp. Elec. Soln. No. 1-33 | | | 111 | 106 |
| Comp. Ex. 1-34 | Comp. Elec. Soln. No. 1-34 | | | 109 | 103 |
| Comp. Ex. 1-35 | Comp. Elec. Soln. No. 1-35 | | | 108 | 104 |
| Comp. Ex. 1-36 | Comp. Elec. Soln. No. 1-36 | | | 111 | 105 |
| Comp. Ex. 1-37 | Comp. Elec. Soln. No. 1-37 | | | 110 | 107 |
| Comp. Ex. 1-38 | Comp. Elec. Soln. No. 1-38 | | | 100 | 100 |
| Comp. Ex. 1-39 | Comp. Elec. Soln. No. 1-39 | | | 109 | 91 |
| Comp. Ex. 1-40 | Comp. Elec. Soln. No. 1-40 | | | 111 | 107 |
| Comp. Ex. 1-41 | Comp. Elec. Soln. No. 1-41 | | | 100 | 100 |
| Comp. Ex. 1-42 | Comp. Elec. Soln. No. 1-42 | | | 109 | 93 |
| Comp. Ex. 1-43 | Comp. Elec. Soln. No. 1-43 | | | 110 | 106 |

As is seen from comparison of the above evaluation results, it was possible to improve the high-temperature storage characteristics of the battery and reduce the gas generation amount during the high-temperature storage of the battery by the combined use of the components (I) and (II) as compared to Comparative Examples 1-2 to 1-9 using the component (I) alone. Similarly, it was possible to improve the high-temperature storage characteristics of the battery and reduce the gas generation amount during the high-temperature storage of the battery as compared to Comparative Examples 1-10 to 1-14 using the component (II) alone. The same tendency was seen in Examples 1-42 to 1-58 using varying combinations of the solute, the components (I) and (II) and the other additive.

No improvement of the high-temperature storage characteristics of the battery and no reduction of the gas generation amount during the high-temperature storage of the battery were observed in Comparative Examples 1-15 to 1-18 using the silicon compound whose structure was not of the above general formula (1) (i.e. $R^2$ was not a fluorine group or a $C_1$-$C_{10}$ linear or $C_3$-$C_{10}$ branched alkyl group, or x was 1 or smaller).

<Preparation of Electrolytic Solutions No. 2-1 to 2-47 and Comparative Electrolytic Solutions No. 2-1 to 2-13>

Electrolytic solutions No. 2-1 to 2-47 and comparative electrolytic solutions No. 2-1 to 2-13 were prepared in the same manner as the electrolytic solution No. 1-1. More specifically, each of the electrolytic solutions No. 2-1 to 2-47 and the comparative electrolytic solutions No. 2-1 to 2-13 was prepared by using a mixed solvent of EC, PC, DMC and EMC at a volume ratio of 2:1:3:4 as a nonaqueous solvent, dissolving 1.0 mol/L of LiPF$_6$ as a solute in the mixed solvent and further dissolving predetermined amounts of the components (I) and (II) and, optionally the other additive, as shown in TABLES 6 and 7.

Herein, the compound No. 2-30 was of the following structure.

Compound No. 2-30

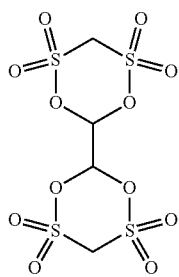

TABLE 6

| | (I) Kind (Comp. No.) | Mass % | (II) Kind (Comp. No.) | Mass % | Other Additive Kind | Mass % |
|---|---|---|---|---|---|---|
| Elec. Soln. No. 2-1 | No. 1-2 | 0.005 | No. 2-1 | 1.0 | None | |
| Elec. Soln. No. 2-2 | | 0.01 | | 1.0 | | |
| Elec. Soln. No. 2-3 | | 0.05 | | 1.0 | | |
| Elec. Soln. No. 2-4 | | 0.1 | | 1.0 | | |
| Elec. Soln. No. 2-5 | | 0.5 | | 1.0 | | |
| Elec. Soln. No. 2-6 | | 2.0 | | 1.0 | | |
| Elec. Soln. No. 2-7 | | 5.0 | | 1.0 | | |
| Elec. Soln. No. 2-8 | | 10.0 | | 1.0 | | |
| Elec. Soln. No. 2-9 | No. 1-2 | 0.5 | No. 2-1 | 0.05 | | |
| Elec. Soln. No. 2-10 | | 0.5 | | 0.1 | | |
| Elec. Soln. No. 2-11 | | 0.5 | | 0.5 | | |
| Elec. Soln. No. 2-12 | | 0.5 | | 2.0 | | |
| Elec. Soln. No. 2-13 | | 0.5 | | 5.0 | | |
| Elec. Soln. No. 2-14 | No. 1-1 | 0.5 | No. 2-1 | 1.0 | | |
| Elec. Soln. No. 2-15 | No. 1-3 | 0.5 | | 1.0 | | |
| Elec. Soln. No. 2-16 | No. 1-4 | 0.5 | | 1.0 | | |
| Elec. Soln. No. 2-17 | No. 1-5 | 0.5 | | 1.0 | | |
| Elec. Soln. No. 2-18 | No. 1-6 | 0.5 | | 1.0 | | |
| Elec. Soln. No. 2-19 | No. 1-7 | 0.5 | | 1.0 | | |
| Elec. Soln. No. 2-20 | No. 1-8 | 0.5 | | 1.0 | | |
| Elec. Soln. No. 2-21 | No. 1-9 | 0.5 | | 1.0 | | |
| Elec. Soln. No. 2-22 | No. 1-10 | 0.5 | | 1.0 | | |
| Elec. Soln. No. 2-23 | No. 1-11 | 0.5 | | 1.0 | | |
| Elec. Soln. No. 2-24 | No. 1-12 | 0.5 | | 1.0 | | |
| Elec. Soln. No. 2-25 | No. 1-13 | 0.5 | | 1.0 | | |
| Elec. Soln. No. 2-26 | No. 1-14 | 0.5 | | 1.0 | | |
| Elec. Soln. No. 2-27 | No. 1-15 | 0.5 | | 1.0 | | |
| Elec. Soln. No. 2-28 | No. 1-16 | 0.5 | | 1.0 | | |
| Elec. Soln. No. 2-29 | No. 1-17 | 0.5 | | 1.0 | | |
| Elec. Soln. No. 2-30 | No. 1-18 | 0.5 | | 1.0 | | |
| Elec. Soln. No. 2-31 | No. 1-19 | 0.5 | | 1.0 | | |
| Elec. Soln. No. 2-32 | No. 1-20 | 0.5 | | 1.0 | | |
| Elec. Soln. No. 2-33 | No. 1-21 | 0.5 | | 1.0 | | |
| Elec. Soln. No. 2-34 | No. 1-22 | 0.5 | | 1.0 | | |
| Elec. Soln. No. 2-35 | No. 1-23 | 0.5 | | 1.0 | | |
| Elec. Soln. No. 2-36 | No. 1-24 | 0.5 | | 1.0 | | |
| Elec. Soln. No. 2-37 | No. 1-25 | 0.5 | | 1.0 | | |
| Elec. Soln. No. 2-38 | No. 1-2 | 0.5 | No. 2-2 | 1.0 | | |
| Elec. Soln. No. 2-39 | | 0.5 | No. 2-10 | 1.0 | | |
| Elec. Soln. No. 2-40 | | 0.5 | No. 2-15 | 1.0 | | |
| Elec. Soln. No. 2-41 | | 0.5 | No. 2-16 | 1.0 | | |
| Elec. Soln. No. 2-42 | | 0.5 | No. 2-19 | 1.0 | | |
| Elec. Soln. No. 2-43 | No. 1-2 | 0.5 | No. 2-1 | 0.5 | | |
| | | | No. 2-15 | 0.5 | | |
| Elec. Soln. No. 2-44 | No. 1-2 | 0.5 | No. 2-1 | 0.5 | 4,5-DFEC | 1.0 |
| Elec. Soln. No. 2-45 | No. 1-2 | 0.5 | No. 2-1 | 0.5 | 1,3-PRS | None 0.5 |
| Elec. Soln. No. 2-46 | No. 1-6 | 0.5 | No. 2-1 | 0.5 | | |
| | | | No. 2-30 | 0.5 | | |
| Elec. Soln. No. 2-47 | No. 1-6 | 0.5 | No. 2-1 | 0.5 | | |
| | | | 1,2-ES | 0.5 | | |

TABLE 7

| | (I) Kind (Comp. No.) | Mass % | (II) Kind (Comp. No.) | Mass % | Other Additive Kind | Mass % |
|---|---|---|---|---|---|---|
| Comp. Elec. Soln. No. 2-1 | None | | No. 2-1 | 1.0 | None | |
| Comp. Elec. Soln. No. 2-2 | | | No. 2-2 | 1.0 | | |
| Comp. Elec. Soln. No. 2-3 | | | No. 2-10 | 1.0 | | |
| Comp. Elec. Soln. No. 2-4 | | | No. 2-15 | 1.0 | | |
| Comp. Elec. Soln. No. 2-5 | | | No. 2-16 | 1.0 | | |
| Comp. Elec. Soln, No. 2-6 | | | No. 2-19 | 1.0 | | |
| Comp. Elec. Soln. No. 2-7 | | | No. 2-30 | 1.0 | | |
| Comp. Elec. Soln. No. 2-8 | | | No. 2-1 | 0.5 | | |
| | | | No. 2-30 | 0.5 | | |
| Comp. Elec. Soln. No. 2-9 | | | No. 2-1 | 0.5 | | |
| | | | 1,2-ES | 0.5 | | |
| Comp. Elec. Soln. No. 2-10 | No. 1-26 | 0.5 | No. 2-1 | 1.0 | | |
| Comp. Elec. Soln. No. 2-11 | No. 1-27 | 0.5 | | 1.0 | | |
| Comp. Elec. Soln. No. 2-12 | No. 1-28 | 0.5 | | 1.0 | | |
| Comp. Elec. Soln. No. 2-13 | No. 1-29 | 0.5 | | 1.0 | | |

Examples 2-1 to 2-47 and Comparative Examples 2-1 to 2-13

Production and Evaluation of Nonaqueous Electrolyte Batteries

Nonaqueous electrolyte batteries of Examples 2-1 to 2-47 and Comparative Examples 2-1 to 2-13 were produced in the same manner as the nonaqueous electrolyte battery of Example 1-1 by providing aluminum laminate-packed cells (capacity 30 mAh), each of which had a NCM positive electrode for testing, a graphite negative electrode for testing and a separator of cellulose, and respectively impregnating the aluminum laminate-packed cells with the electrolytic solutions No. 2-1 to 2-47 and the comparative electrolytic solutions No. 2-1 to 2-13 listed in TABLES 6 and 7.

The following evaluations were performed on these non-aqueous electrolyte batteries in the same manner as in Example 1-1.

<Evaluation 1> High-temperature storage characteristics (70° C.)

<Evaluation 2> Gas generation amount during high-temperature storage (70° C.)

In TABLE 8, the results of the evaluations (<Evaluation 1> and <Evaluation 2>) of the nonaqueous electrolyte batteries of Examples 2-1 to 2-47 and Comparative Examples 2-1 to 2-13 are indicated as relative values assuming the results of the evaluations of the nonaqueous electrolyte battery of Comparative Example 1-1 as 100.

TABLE 8

| | Elec. Soln. No. | Positive Electrode Material | Negative Electrode Material | Discharge Capacity Retention Rate After Storage at 70° C. | Gas Generation Amount After Storage at 70° C. |
|---|---|---|---|---|---|
| Ex. 2-1 | Elec. Soln. No. 2-1 | $Li_{1/3}$ $Co_{1/3}$ $Mn_{1/3}O_2$ | Graphite | 118 | 90 |
| Ex. 2-2 | Elec. Soln. No. 2-2 | | | 118 | 89 |
| Ex. 2-3 | Elec. Soln. No. 2-3 | | | 120 | 85 |
| Ex. 2-4 | Elec. Soln. No. 2-4 | | | 126 | 81 |
| Ex. 2-5 | Elec. Soln. No. 2-5 | | | 134 | 76 |
| Ex. 2-6 | Elec. Soln. No. 2-6 | | | 133 | 78 |
| Ex. 2-7 | Elec. Soln. No. 2-7 | | | 133 | 80 |
| Ex. 2-8 | Elec. Soln. No. 2-8 | | | 129 | 82 |
| Ex. 2-9 | Elec. Soln. No. 2-9 | | | 117 | 88 |
| Ex. 2-10 | Elec. Soln. No. 2-10 | | | 125 | 86 |
| Ex. 2-11 | Elec. Soln. No. 2-11 | | | 131 | 79 |
| Ex. 2-12 | Elec. Soln. No. 2-12 | | | 132 | 82 |
| Ex. 2-13 | Elec. Soln. No. 2-13 | | | 128 | 85 |
| Ex. 2-14 | Elec. Soln. No. 2-14 | | | 124 | 77 |
| Ex. 2-15 | Elec. Soln. No. 2-15 | | | 120 | 84 |
| Ex. 2-16 | Elec. Soln. No. 2-16 | | | 120 | 81 |
| Ex. 2-17 | Elec. Soln. No. 2-17 | | | 122 | 78 |
| Ex. 2-18 | Elec. Soln. No. 2-18 | | | 129 | 75 |
| Ex. 2-19 | Elec. Soln. No. 2-19 | | | 127 | 77 |
| Ex. 2-20 | Elec. Soln. No. 2-20 | | | 130 | 74 |
| Ex. 2-21 | Elec. Soln. No. 2-21 | | | 128 | 76 |
| Ex. 2-22 | Elec. Soln. No. 2-22 | | | 126 | 76 |
| Ex. 2-23 | Elec. Soln. No. 2-23 | | | 120 | 79 |
| Ex. 2-24 | Elec. Soln. No. 2-24 | | | 118 | 85 |
| Ex. 2-25 | Elec. Soln. No. 2-25 | | | 120 | 83 |
| Ex. 2-26 | Elec. Soln. No. 2-26 | | | 119 | 83 |
| Ex. 2-27 | Elec. Soln. No. 2-27 | | | 120 | 82 |
| Ex. 2-28 | Elec. Soln. No. 2-28 | | | 132 | 77 |
| Ex. 2-29 | Elec. Soln. No. 2-29 | | | 129 | 75 |
| Ex. 2-30 | Elec. Soln. No. 2-30 | | | 119 | 84 |
| Ex. 2-31 | Elec. Soln. No. 2-31 | | | 118 | 83 |
| Ex. 2-32 | Elec. Soln. No. 2-32 | | | 127 | 81 |
| Ex. 2-33 | Else. Soln. No. 2-33 | | | 130 | 78 |
| Ex. 2-34 | Elec. Soln. No. 2-34 | | | 128 | 78 |
| Ex. 2-35 | Elec. Soln. No. 2-35 | | | 122 | 82 |
| Ex. 2-36 | Elec. Soln. No. 2-36 | | | 121 | 83 |
| Ex. 2-37 | Elec. Soln. No. 2-37 | | | 125 | 81 |
| Ex. 2-38 | Elec. Soln. No. 2-38 | | | 131 | 75 |
| Ex. 2-39 | Elec. Soln. No. 2-39 | | | 128 | 74 |
| Ex. 2-40 | Elec. Soln. No. 2-40 | | | 129 | 77 |
| Ex. 2-41 | Elec. Soln. No. 2-41 | | | 129 | 76 |
| Ex. 2-42 | Elec. Soln. No. 2-42 | | | 125 | 83 |
| Ex. 2-43 | Elec. Soln. No. 2-43 | | | 133 | 76 |
| Ex. 2-44 | Elec. Soln. No. 2-44 | | | 133 | 76 |
| Ex. 2-45 | Elec. Soln. No. 2-45 | | | 134 | 76 |
| Ex. 2-46 | Elec. Soln. No. 2-46 | | | 128 | 75 |
| Ex. 2-47 | Elec. Soln. No. 2-47 | | | 131 | 75 |
| Comp. Ex. 2-1 | Comp. Elec. Soln. No. 2-1 | | | 116 | 108 |
| Comp. Ex. 2-2 | Comp. Elec. Soln. No. 2-2 | | | 115 | 106 |
| Comp. Ex. 2-3 | Comp. Elec. Soln. No. 2-3 | | | 114 | 105 |
| Comp. Ex. 2-4 | Comp. Elec. Soln. No. 2-4 | | | 116 | 107 |
| Comp. Ex. 2-5 | Comp. Elec. Soln. No. 2-5 | | | 115 | 106 |
| Comp. Ex. 2-6 | Comp. Elec. Soln. No. 2-6 | | | 116 | 106 |
| Comp. Ex. 2-7 | Comp. Elec. Soln. No. 2-7 | | | 115 | 108 |
| Comp. Ex. 2-8 | Comp. Elec. Soln. No. 2-8 | | | 115 | 108 |
| Comp. Ex. 2-9 | Comp. Elec. Soln. No. 2-9 | | | 117 | 109 |
| Comp. Ex. 2-10 | Comp. Elec. Soln. No. 2-10 | | | 97 | 111 |
| Comp. Ex. 2-11 | Comp. Elec. Soln. No. 2-11 | | | 94 | 113 |
| Comp. Ex. 2-12 | Comp. Elec. Soln. No. 2-12 | | | 99 | 108 |
| Comp. Ex. 2-13 | Comp. Elec. Soln. No. 2-13 | | | 96 | 112 |

As is seen from comparison of the above evaluation results, it was possible to improve the high-temperature storage characteristics of the battery and reduce the gas generation amount during the high-temperature storage of the battery by the combined use of the components (I) and (II) as compared to Comparative Examples 1-2 to 1-9 using the component (I) alone. Similarly, it was possible to improve the high-temperature storage characteristics of the battery and reduce the gas generation amount during the high-temperature storage of the battery as compared to Comparative Examples 2-1 to 2-9 using the component (II) alone.

No improvement of the high-temperature storage characteristics of the battery and no reduction of the gas generation amount during the high-temperature storage of the battery were observed in Comparative Examples 2-10 to 2-13 using the silicon compound whose structure was not of the above general formula (1) (i.e. $R^2$ was not a fluorine group or a $C_1$-$C_{10}$ linear or $C_3$-$C_{10}$ branched alkyl group, or x was 1 or smaller).

<Preparation of Electrolytic Solutions No. 3-1 to 3-45 and Comparative Electrolytic Solutions No. 3-1 to 3-9>

Electrolytic solutions No. 3-1 to 3-45 and comparative electrolytic solutions No. 3-1 to 3-9 were prepared in the same manner as the electrolytic solution No. 1-1. More specifically, each of the electrolytic solutions No. 3-1 to 3-45 and the comparative electrolytic solutions No. 3-1 to 3-9 was prepared by using a mixed solvent of EC, PC, DMC and EMC at a volume ratio of 2:1:3:4 as a nonaqueous solvent, dissolving 1.0 mol/L of $LiPF_6$ as a solute in the mixed solvent and further dissolving predetermined amounts of the components (I) and (II) and, optionally the other additive, as shown in TABLE 9.

TABLE 9

| | (I) | | (II) | | Other Additive | |
|---|---|---|---|---|---|---|
| | Kind (Comp. No.) | Mass % | Kind (Comp. No.) | Mass % | Kind | Mass % |
| Elec. Soln. No. 3-1 | No. 1-2 | 0.005 | No. 3-1 | 1.0 | None | |
| Elec. Soln. No. 3-2 | | 0.01 | | 1.0 | | |
| Elec. Soln. No. 3-3 | | 0.05 | | 1.0 | | |
| Elec. Soln. No. 3-4 | | 0.1 | | 1.0 | | |
| Elec. Soln. No. 3-5 | | 0.5 | | 1.0 | | |
| Elec. Soln. No. 3-6 | | 2.0 | | 1.0 | | |
| Elec. Soln. No. 3-7 | | 5.0 | | 1.0 | | |
| Elec. Soln. No. 3-8 | | 10.0 | | 1.0 | | |
| Elec. Soln. No. 3-9 | No. 1-2 | 0.5 | No. 3-1 | 0.05 | | |
| Elec. Soln. No. 3-10 | | 0.5 | | 0.1 | | |
| Elec. Soln. No. 3-11 | | 0.5 | | 0.5 | | |
| Elec. Soln. No. 3-12 | | 0.5 | | 2.0 | | |
| Elec. Soln. No. 3-13 | | 0.5 | | 5.0 | | |
| Elec. Soln. No. 3-14 | No. 1-1 | 0.5 | No. 3-1 | 1.0 | | |
| Elec. Soln. No. 3-15 | No. 1-3 | 0.5 | | 1.0 | | |
| Elec. Soln. No. 3-16 | No. 1-4 | 0.5 | | 1.0 | | |
| Elec. Soln. No. 3-17 | No. 1-5 | 0.5 | | 1.0 | | |
| Elec. Soln. No. 3-18 | No. 1-6 | 0.5 | | 1.0 | | |
| Elec. Soln. No. 3-19 | No. 1-7 | 0.5 | | 1.0 | | |
| Elec. Soln. No. 3-20 | No. 1-8 | 0.5 | | 1.0 | | |
| Elec. Soln. No. 3-21 | No. 1-9 | 0.5 | | 1.0 | | |
| Elec. Soln. No. 3-22 | No. 1-10 | 0.5 | | 1.0 | | |
| Elec. Soln. No. 3-23 | No. 1-11 | 0.5 | | 1.0 | | |
| Elec. Soln. No. 3-24 | No. 1-12 | 0.5 | | 1.0 | | |
| Elec. Soln. No. 3-25 | No. 1-13 | 0.5 | | 1.0 | | |
| Elec. Soln. No. 3-26 | No. 1-14 | 0.5 | | 1.0 | | |
| Elec. Soln. No. 3-27 | No. 1-15 | 0.5 | | 1.0 | | |
| Elec. Soln. No. 3-28 | No. 1-16 | 0.5 | | 1.0 | | |
| Elec. Soln. No. 3-29 | No. 1-17 | 0.5 | | 1.0 | | |
| Elec. Soln. No. 3-30 | No. 1-18 | 0.5 | | 1.0 | | |
| Elec. Soln. No. 3-31 | No. 1-19 | 0.5 | | 1.0 | | |
| Elec. Soln. No. 3-32 | No. 1-20 | 0.5 | | 1.0 | | |
| Flec. Soln. No. 3-33 | No. 1-21 | 0.5 | | 1.0 | | |
| Elec. Soln. No. 3-34 | No. 1-22 | 0.5 | | 1.0 | | |
| Elec. Soln. No. 3-35 | No. 1-23 | 0.5 | | 1.0 | | |
| Elec. Soln. No. 3-36 | No. 1-24 | 0.5 | | 1.0 | | |
| Elec. Soln. No. 3-37 | No. 1-25 | 0.5 | | 1.0 | | |
| Elec. Soln. No. 3-38 | No. 1-2 | 0.5 | No. 3-2 | 1.0 | | |
| Elec. Soln. No. 3-39 | | 0.5 | No. 3-4 | 1.0 | | |
| Elec. Soln. No. 3-40 | | 0.5 | No. 3-5 | 1.0 | | |
| Elec. Soln. No. 3-41 | No. 1-2 | 0.5 | No. 3-1 | 0.5 | | |
| | | | No. 3-5 | 0.5 | | |
| Elec. Soln. No. 3-42 | No. 1-2 | 0.5 | No. 3-1 | 0.5 | 4,5-DFEC | 1.0 |
| Elec. Soln. No. 3-43 | No. 1-2 | 0.5 | No. 3-1 | 0.5 | None | |
| | | | 1,3-PRS | 0.5 | | |
| Elec. Soln. No. 3-44 | No. 1-2 | 0.5 | No. 3-1 | 0.5 | | |
| | | | No. 2-1 | 0.5 | | |
| Elec. Soln. No. 3-45 | No. 1-6 | 0.5 | No. 3-1 | 0.5 | | |
| | | | 1,2-ES | 0.5 | | |
| Comp. Elec. Soln. No. 3-1 | None | | No. 3-1 | 1.0 | | |
| Comp. Elec. Soln. No. 3-2 | | | No. 3-2 | 1.0 | | |
| Comp. Elec. Soln. No. 3-3 | | | No. 3-4 | 1.0 | | |
| Comp. Elec. Soln. No. 3-4 | | | No. 3-5 | 1.0 | | |
| Comp. Elec. Soln. No. 3-5 | | | No. 3-1 | 0.5 | | |
| | | | 1,2-ES | 0.5 | | |
| Comp. Elec. Soln. No. 3-6 | No. 1-26 | 0.5 | No. 3-1 | 1.0 | | |
| Comp. Elec. Soln. No. 3-7 | No. 1-27 | 0.5 | | 1.0 | | |
| Comp. Elec. Soln. No. 3-8 | No. 1-28 | 0.5 | | 1.0 | | |
| Comp. Elec. Soln. No. 3-9 | No. 1-29 | 0.5 | | 1.0 | | |

Examples 3-1 to 3-45 and Comparative Examples 3-1 to 3-9

Production and Evaluation of Nonaqueous Electrolyte Batteries

Nonaqueous electrolyte batteries of Examples 3-1 to 3-45 and Comparative Examples 3-1 to 3-9 were produced in the same manner as the nonaqueous electrolyte battery of Example 1-1 by providing aluminum laminate-packed cells (capacity 30 mAh), each of which had a NCM positive electrode for testing, a graphite negative electrode for testing and a separator of cellulose, and respectively impregnating the aluminum laminate-packed cells with the electrolytic solutions No. 3-1 to 3-45 and the comparative electrolytic solutions No. 3-1 to 3-9 listed in TABLE 9.

The following evaluations were performed on these nonaqueous electrolyte batteries in the same manner as in Example 1-1.

<Evaluation 1> High-temperature storage characteristics (70° C.)

<Evaluation 2> Gas generation amount during high-temperature storage (70° C.)

In TABLE 10, the results of the evaluations (<Evaluation 1> and <Evaluation 2>) of the nonaqueous electrolyte batteries of Examples 3-1 to 3-45 and Comparative Examples 3-1 to 3-9 are indicated as relative values assuming the results of the evaluations of the nonaqueous electrolyte battery of Comparative Example 1-1 as 100.

TABLE 10

| | Elec. Soln. No. | Positive Electrode Material | Negative Electrode Material | Discharge Capacity Retention Rate After Storage at 70° C. | Gas Generation Amount After Storage at 70° C. |
|---|---|---|---|---|---|
| Ex. 3-1 | Elec. Soln. No. 3-1 | $LiNi_{1/3}Co_{1/3}Mn_{1/3}O_2$ | Graphite | 117 | 89 |
| Ex. 3-2 | Elec. Soln. No. 3-2 | | | 118 | 89 |
| Ex. 3-3 | Elec. Soln. No. 3-3 | | | 120 | 84 |
| Ex. 3-4 | Elec. Soln. No. 3-4 | | | 127 | 79 |
| Ex. 3-5 | Elec. Soln. No. 3-5 | | | 134 | 77 |
| Ex. 3-6 | Elec. Soln. No. 3-6 | | | 134 | 79 |

TABLE 10-continued

| | Elec. Soln. No. | Positive Electrode Material | Negative Electrode Material | Discharge Capacity Retention Rate After Storage at 70° C. | Gas Generation Amount After Storage at 70° C. |
|---|---|---|---|---|---|
| Ex. 3-7 | Elec. Soln. No. 3-7 | | | 133 | 80 |
| Ex. 3-8 | Elec. Soln. No. 3-8 | | | 130 | 81 |
| Ex. 3-9 | Elec. Soln. No. 3-9 | | | 117 | 88 |
| Ex. 3-10 | Elec. Soln. No. 3-10 | | | 126 | 86 |
| Ex. 3-11 | Elec. Soln. No. 3-11 | | | 132 | 81 |
| Ex. 3-12 | Elec. Soln. No. 3-12 | | | 129 | 82 |
| Ex. 3-13 | Elec. Soln. No. 3-13 | | | 127 | 86 |
| Ex. 3-14 | Elec. Soln. No. 3-14 | | | 125 | 77 |
| Ex. 3-15 | Elec. Soln. No. 3-15 | | | 120 | 84 |
| Ex. 3-16 | Elec. Soln. No. 3-16 | | | 119 | 81 |
| Ex. 3-17 | Elec. Soln. No. 3-17 | | | 121 | 78 |
| Ex. 3-18 | Elec. Soln. No. 3-18 | | | 130 | 75 |
| Ex. 3-19 | Elec. Soln. No. 3-19 | | | 128 | 77 |
| Ex. 3-20 | Elec. Soln. No. 3-20 | | | 129 | 75 |
| Ex. 3-21 | Elec. Soln. No. 3-21 | | | 127 | 76 |
| Ex. 3-22 | Elec. Soln. No. 3-22 | | | 126 | 77 |
| Ex. 3-23 | Elec. Soln. No. 3-23 | | | 121 | 80 |
| Ex. 3-24 | Elec. Soln. No. 3-24 | | | 119 | 85 |
| Ex. 3-25 | Elec. Soln. No. 3-25 | | | 119 | 84 |
| Ex. 3-26 | Elec. Soln. No. 3-26 | | | 120 | 82 |
| Ex. 3-27 | Elec. Soln. No. 3-27 | | | 120 | 82 |
| Ex. 3-28 | Elec. Soln. No. 3-28 | | | 131 | 76 |
| Ex. 3-29 | Elec. Soln. No. 3-29 | | | 130 | 76 |
| Ex. 3-30 | Elec. Soln. No. 3-30 | | | 119 | 84 |
| Ex. 3-31 | Elec. Soln. No. 3-31 | | | 118 | 83 |
| Ex. 3-32 | Elec. Soln. No. 3-32 | | | 128 | 82 |
| Ex. 3-33 | Elec. Soln. No. 3-33 | | | 129 | 79 |
| Ex. 3-34 | Elec. Soln. No. 3-34 | | | 128 | 80 |
| Ex. 3-35 | Elec. Soln. No. 3-35 | | | 121 | 82 |
| Ex. 3-36 | Elec. Soln. No. 3-36 | | | 121 | 83 |
| Ex. 3-37 | Elec. Soln. No. 3-37 | | | 126 | 82 |
| Ex. 3-38 | Elec. Soln. No. 3-38 | | | 132 | 78 |
| Ex. 3-39 | Elec. Soln. No. 3-39 | | | 124 | 84 |
| Ex. 3-40 | Elec. Soln. No. 3-40 | | | 129 | 76 |
| Ex. 3-41 | Elec. Soln. No. 3-41 | | | 130 | 77 |
| Ex. 3-42 | Elec. Soln. No. 3-42 | | | 133 | 74 |
| Ex. 3-43 | Elec. Soln. No. 3-43 | | | 133 | 77 |
| Ex. 3-44 | Elec. Soln. No. 3-44 | | | 134 | 78 |
| Ex. 3-45 | Elec. Soln. No. 3-45 | | | 132 | 75 |
| Comp. Ex. 3-1 | Comp. Elec. Soln. No. 3-1 | | | 116 | 108 |
| Comp. Ex. 3-2 | Comp. Elec. Soln. No. 3-2 | | | 114 | 109 |
| Comp. Ex. 3-3 | Comp. Elec. Soln. No. 3-3 | | | 115 | 108 |
| Comp. Ex. 3-4 | Comp. Elec. Soln. No. 3-4 | | | 116 | 108 |
| Comp. Ex. 3-5 | Comp. Elec. Soln. No. 3-5 | | | 117 | 109 |
| Comp. Ex. 3-6 | Comp. Elec. Soln. No. 3-6 | | | 98 | 110 |
| Comp. Ex. 3-7 | Comp. Elec. Soln. No. 3-7 | | | 95 | 110 |
| Comp. Ex. 3-8 | Comp. Elec. Soln. No. 3-8 | | | 98 | 109 |
| Comp. Ex. 3-9 | Comp. Elec. Soln. No. 3-9 | | | 96 | 111 |

As is seen from comparison of the above evaluation results, it was possible to improve the high-temperature storage characteristics of the battery and reduce the gas generation amount during the high-temperature storage of the battery by the combined use of the components (I) and (II) as compared to Comparative Examples 1-2 to 1-9 using the component (I) alone. Similarly, it was possible to improve the high-temperature storage characteristics of the battery and reduce the gas generation amount during the high-temperature storage of the battery as compared to Comparative Examples 3-1 to 3-5 using the component (II) alone.

No improvement of the high-temperature storage characteristics of the battery and no reduction of the gas generation amount during the high-temperature storage of the battery were observed in Comparative Examples 3-6 to 3-9 using the silicon compound whose structure was not of the above general formula (1) (i.e. $R^2$ was not a fluorine group or a $C_1$-$C_{10}$ linear or $C_3$-$C_{10}$ branched alkyl group, or x was 1 or smaller).

<Preparation of Electrolytic Solutions No. 4-1 to 4-45 and Comparative Electrolytic Solutions No. 4-1 to 4-9>

Electrolytic solutions No. 4-1 to 4-45 and comparative electrolytic solutions No. 4-1 to 4-9 were prepared in the same manner as the electrolytic solution No. 1-1. More specifically, each of the electrolytic solutions No. 4-1 to 4-45 and the comparative electrolytic solutions No. 4-1 to 4-9 was prepared by using a mixed solvent of EC, PC, DMC and EMC at a volume ratio of 2:1:3:4 as a nonaqueous solvent, dissolving 1.0 mol/L of $LiPF_6$ as a solute in the mixed solvent and further dissolving predetermined amounts of the components (I) and (II) and, optionally, the other additive, as shown in TABLE 11. In the table, 1,4-BS refers to 1,4-butane sultone; and HFPS refers to α-heptafluoropropyl-γ-sultone.

TABLE 11

| | (I) Kind (Comp. No.) | (I) Mass % | (II) Kind (Comp. No.) | (II) Mass % | Other Additive Kind | Other Additive Mass % |
|---|---|---|---|---|---|---|
| Elec. Soln. No. 4-1 | No. 1-2 | 0.005 | 1,3-PS | 1.0 | None | |
| Elec. Soln. No. 4-2 | | 0.01 | | 1.0 | | |
| Elec. Soln. No. 4-3 | | 0.05 | | 1.0 | | |
| Elec. Soln. No. 4-4 | | 0.1 | | 1.0 | | |
| Elec. Soln. No. 4-5 | | 0.5 | | 1.0 | | |
| Elec. Soln. No. 4-6 | | 2.0 | | 1.0 | | |
| Elec. Soln. No. 4-7 | | 5.0 | | 1.0 | | |
| Elec. Soln. No. 4-8 | | 10.0 | | 1.0 | | |
| Elec. Soln. No. 4-9 | No. 1-2 | 0.5 | 1,3-PS | 0.05 | | |
| Elec. Soln. No. 4-10 | | 0.5 | | 0.1 | | |
| Elec. Soln. No. 4-11 | | 0.5 | | 2.0 | | |
| Elec. Soln. No. 4-12 | | 0.5 | | 3.0 | | |
| Elec. Soln. No. 4-13 | No. 1-1 | 0.5 | 1,3-PS | 1.0 | | |
| Elec. Soln. No. 4-14 | No. 1-3 | 0.5 | | 1.0 | | |
| Elec. Soln. No. 4-15 | No. 1-4 | 0.5 | | 1.0 | | |
| Elec. Soln. No. 4-16 | No. 1-5 | 0.5 | | 1.0 | | |
| Elec. Soln. No. 4-17 | No. 1-6 | 0.5 | | 1.0 | | |
| Elec. Soln. No. 4-18 | No. 1-7 | 0.5 | | 1.0 | | |
| Elec. Soln. No. 4-19 | No. 1-8 | 0.5 | | 1.0 | | |
| Elec. Soln. No. 4-20 | No. 1-9 | 0.5 | | 1.0 | | |
| Elec. Soln. No. 4-21 | No. 1-10 | 0.5 | | 1.0 | | |
| Elec. Soln. No. 4-22 | No. 1-11 | 0.5 | | 1.0 | | |
| Elec. Soln. No. 4-23 | No. 1-12 | 0.5 | | 1.0 | | |
| Elec. Soln. No. 4-24 | No. 1-13 | 0.5 | | 1.0 | | |
| Elec. Soln. No. 4-25 | No. 1-14 | 0.5 | | 1.0 | | |
| Elec. Soln. No. 4-26 | No. 1-15 | 0.5 | | 1.0 | | |
| Elec. Soln. No. 4-27 | No. 1-16 | 0.5 | | 1.0 | | |
| Elec. Soln. No. 4-28 | No. 1-17 | 0.5 | | 1.0 | | |
| Elec. Soln. No. 4-29 | No. 1-18 | 0.5 | | 1.0 | | |
| Elec. Soln. No. 4-30 | No. 1-19 | 0.5 | | 1.0 | | |
| Elec. Soln. No. 4-31 | No. 1-20 | 0.5 | | 1.0 | | |
| Elec. Soln. No. 4-32 | No. 1-21 | 0.5 | | 1.0 | | |
| Elec. Soln. No. 4-33 | No. 1-22 | 0.5 | | 1.0 | | |
| Elec. Soln. No. 4-34 | No. 1-23 | 0.5 | | 1.0 | | |
| Elec. Soln. No. 4-35 | No. 1-24 | 0.5 | | 1.0 | | |
| Elec. Soln. No. 4-36 | No. 1-25 | 0.5 | | 1.0 | | |
| Elec. Soln. No. 4-37 | No. 1-2 | 0.5 | 1,4-BS | 1.0 | | |
| Elec. Soln. No. 4-38 | | 0.5 | HFPS | 1.0 | | |
| Elec. Soln. No. 4-39 | No. 1-2 | 0.5 | 1,3-PS | 0.5 | | |
| | | | 1,4-BS | 0.5 | | |
| Elec. Soln. No. 4-40 | No. 1-2 | 0.5 | 1,3-PS | 0.5 | 4,5-DFEC | 1.0 |
| Elec. Soln. No. 4-41 | No. 1-2 | 0.5 | 1,3-PS | 0.5 | None | |
| | | | 1,3-PRS | 0.5 | | |
| Elec. Soln. No. 4-42 | No. 1-2 | 0.5 | 1,3-PS | 0.5 | | |
| | | | No. 2-1 | 0.5 | | |
| Elec. Soln. No. 4-43 | No. 1-2 | 0.5 | 1,3-PS | 0.5 | | |
| | | | No. 3-1 | 0.5 | | |
| Elec. Soln. No. 4-44 | No. 1-6 | 0.5 | 1,2-ES | 1.0 | | |
| Elec. Soln. No. 4-45 | No. 1-6 | 0.5 | 1,3-PS | 0.5 | | |
| | | | 1,2-ES | 0.5 | | |
| Comp. Elec. Soln. No. 4-1 | None | | 1,3-PS | 1.0 | | |
| Comp. Elec. Soln. No. 4-2 | | | 1,4-BS | 1.0 | | |
| Comp. Elec. Soln. No. 4-3 | | | HFPS | 1.0 | | |
| Comp. Elec. Soln. No. 4-4 | | | 1,2-ES | 1.0 | | |
| Comp. Elec. Soln. No. 4-5 | | | 1,3-PS | 0.5 | | |
| | | | 1,2-ES | 0.5 | | |
| Comp. Elec. Soln. No. 4-6 | No. 1-26 | 0.5 | 1,3-PS | 1.0 | | |
| Comp. Elec. Soln. No. 4-7 | No. 1-27 | 0.5 | | 1.0 | | |
| Comp. Elec. Soln. No. 4-8 | No. 1-28 | 0.5 | | 1.0 | | |
| Comp. Elec. Soln. No. 4-9 | No. 1-29 | 0.5 | | 1.0 | | |

Examples 4-1 to 4-45 and Comparative Examples 4-1 to 4-9

Production and Evaluation of Nonaqueous Electrolyte Batteries

Nonaqueous electrolyte batteries of Examples 4-1 to 4-45 and Comparative Examples 4-1 to 4-9 were produced in the same manner as the nonaqueous electrolyte battery of Example 1-1 by providing aluminum laminate-packed cells (capacity 30 mAh), each of which had a NCM positive electrode for testing, a graphite negative electrode for testing and a separator of cellulose, and respectively impregnating the aluminum laminate-packed cells with the electrolytic solutions No. 4-1 to 4-45 and the comparative electrolytic solutions No. 4-1 to 4-9 listed in TABLE 11.

The following evaluations were performed on these nonaqueous electrolyte batteries in the same manner as in Example 1-1.

<Evaluation 1> High-temperature storage characteristics (70° C.)

<Evaluation 2> Gas Generation Amount during high-temperature storage (70° C.)

The results of the evaluations (<Evaluation 1> and <Evaluation 2>) of the nonaqueous electrolyte batteries of Examples 4-1 to 4-45 and Comparative Examples 4-1 to 4-9 are indicated in TABLE 12 as relative values assuming the results of the evaluations of the nonaqueous electrolyte battery of Comparative Example 1-1 as 100.

TABLE 12

| | Elec. Soln. No. | Positive Electrode Material | Negative Electrode Material | Discharge Capacity Retention Rate After Storage at 70° C. | Gas Generation Amount After Storage at 70° C. |
|---|---|---|---|---|---|
| Ex. 4-1 | Elec. Soln. No. 4-1 | $LiNi_{1/3}Co_{1/3}Mn_{1/3}O_2$ | Graphite | 117 | 88 |
| Ex. 4-2 | Elec. Soln. No. 4-2 | | | 118 | 88 |
| Ex. 4-3 | Elec. Soln. No. 4-3 | | | 119 | 86 |
| Ex. 4-4 | Elec. Soln. No. 4-4 | | | 124 | 83 |
| Ex. 4-5 | Elec. Soln. No. 4-5 | | | 132 | 77 |
| Ex. 4-6 | Elec. Soln. No. 4-6 | | | 131 | 78 |
| Ex. 4-7 | Elec. Soln. No. 4-7 | | | 129 | 81 |
| Ex. 4-8 | Elec. Soln. No. 4-8 | | | 128 | 82 |
| Ex. 4-9 | Elec. Soln. No. 4-9 | | | 117 | 88 |
| Ex. 4-10 | Elec. Soln. No. 4-10 | | | 119 | 85 |
| Ex. 4-11 | Elec. Soln. No. 4-11 | | | 131 | 78 |
| Ex. 4-12 | Elec. Soln. No. 4-12 | | | 134 | 81 |

TABLE 12-continued

| | Elec. Soln. No. | Positive Electrode Material | Negative Electrode Material | Discharge Capacity Retention Rate After Storage at 70° C. | Gas Generation Amount After Storage at 70° C. |
|---|---|---|---|---|---|
| Ex. 4-13 | Elec. Soln. No. 4-13 | | | 126 | 81 |
| Ex. 4-14 | Elec. Soln. No. 4-14 | | | 119 | 85 |
| Ex. 4-15 | Elec. Soln. No. 4-15 | | | 123 | 82 |
| Ex. 4-16 | Elec. Soln. No. 4-16 | | | 127 | 79 |
| Ex. 4-17 | Elec. Soln. No. 4-17 | | | 128 | 78 |
| Ex. 4-18 | Elec. Soln. No. 4-18 | | | 126 | 80 |
| Ex. 4-19 | Elec. Soln. No. 4-19 | | | 126 | 79 |
| Ex. 4-20 | Elec. Soln. No. 4-20 | | | 127 | 80 |
| Ex. 4-21 | Elec. Soln. No. 4-21 | | | 125 | 80 |
| Ex. 4-22 | Elec. Soln. No. 4-22 | | | 121 | 82 |
| Ex. 4-23 | Elec. Soln. No. 4-23 | | | 124 | 81 |
| Ex. 4-24 | Elec. Soln. No. 4-24 | | | 122 | 83 |
| Ex. 4-25 | Elec. Soln. No. 4-25 | | | 120 | 83 |
| Ex. 4-26 | Elec. Soln. No. 4-26 | | | 121 | 82 |
| Ex. 4-27 | Elec. Soln. No. 4-27 | | | 131 | 77 |
| Ex. 4-28 | Elec. Soln. No. 4-28 | | | 129 | 79 |
| Ex. 4-29 | Elec. Soln. No. 4-29 | | | 120 | 84 |
| Ex. 4-30 | Elec. Soln. No. 4-30 | | | 120 | 84 |
| Ex. 4-31 | Elec. Soln. No. 4-31 | | | 126 | 83 |
| Ex. 4-32 | Elec. Soln. No. 4-32 | | | 129 | 80 |
| Ex. 4-33 | Elec. Soln. No. 4-33 | | | 128 | 81 |
| Ex. 4-34 | Elec. Soln. No. 4-34 | | | 120 | 83 |
| Ex. 4-35 | Elec. Soln. No. 4-35 | | | 121 | 84 |
| Ex. 4-36 | Elec. Soln. No. 4-36 | | | 125 | 82 |
| Ex. 4-37 | Elec. Soln. No. 4-37 | | | 131 | 79 |
| Ex. 4-38 | Elec. Soln. No. 4-38 | | | 123 | 86 |
| Ex. 4-39 | Elec. Soln. No. 4-39 | | | 132 | 78 |
| Ex. 4-40 | Elec. Soln. No. 4-40 | | | 134 | 77 |
| Ex. 4-41 | Elec. Soln. No. 4-41 | | | 133 | 74 |
| Ex. 4-42 | Elec. Soln. No. 4-42 | | | 133 | 77 |
| Ex. 4-43 | Elec. Soln. No. 4-43 | | | 132 | 77 |
| Ex. 4-44 | Elec. Soln. No. 4-44 | | | 127 | 80 |
| Ex. 4-45 | Elec. Soln. No. 4-45 | | | 129 | 79 |
| Comp. Ex. 4-1 | Comp. Elec. Soln. No. 4-1 | | | 116 | 105 |
| Comp. Ex. 4-2 | Comp. Elec. Soln. No. 4-2 | | | 114 | 103 |
| Comp. Ex. 4-3 | Comp. Elec. Soln. No. 4-3 | | | 114 | 105 |
| Comp. Ex. 4-4 | Comp. Elec. Soln. No. 4-4 | | | 115 | 106 |
| Comp. Ex. 4-5 | Comp. Elec. Soln. No. 4-5 | | | 115 | 106 |
| Comp. Ex. 4-6 | Comp. Elec. Soln. No. 4-6 | | | 99 | 111 |
| Comp. Ex. 4-7 | Comp. Elec. Soln. No. 4-7 | | | 98 | 111 |
| Comp. Ex. 4-8 | Comp. Elec. Soln. No. 4-8 | | | 99 | 108 |
| Comp. Ex. 4-9 | Comp. Elec. Soln. No. 4-9 | | | 97 | 109 |

As is seen from comparison of the above evaluation results, it was possible to improve the high-temperature storage characteristics of the battery and reduce the gas generation amount during the high-temperature storage of the battery by the combined use of the components (I) and (II) as compared to Comparative Examples 1-2 to 1-9 using the component (I) alone. Similarly, it was possible to improve the high-temperature storage characteristics of the battery and reduce the gas generation amount during the high-temperature storage of the battery as compared to Comparative Examples 4-1 to 4-5 using the component (II) alone.

No improvement of the high-temperature storage characteristics of the battery and no reduction of the gas generation amount during the high-temperature storage of the battery were observed in Comparative Examples 4-6 to 4-9 using the silicon compound whose structure was not of the above general formula (1) (i.e. $R^2$ was not a fluorine group or a $C_1$-$C_{10}$ linear or $C_3$-$C_{10}$ branched alkyl group, or x was 1 or smaller).

Examples 5-1 to 5-39 and Comparative Examples 5-1 to 5-27

Production and Evaluation of Nonaqueous Electrolyte Batteries

Nonaqueous electrolyte batteries of Examples 5-1 to 5-39 and Comparative Examples 5-1 to 5-27 were produced and evaluated in the same manner as in Example 1-1 except for varying negative electrodes and electrolytic solutions as shown in TABLES 13 to 15. In Examples 5-1 to 5-13 and Comparative Examples 5-1 to 5-9 where $Li_4Ti_5O_{12}$ was used as a negative electrode material, the negative electrodes were each formed by mixing 90 mass % of a $Li_4Ti_5O_{12}$ powder, 5 mass % of PVDF as a binder and 5 mass % of acetylene black as a conductive agent, adding NMP to the mixture, applying the resulting paste to a copper foil and drying the applied paste. During the evaluation of the batteries, the charge termination voltage was set to 2.7 V; and the discharge termination voltage was set to 1.5 V. In Examples 5-14 to 5-26 and Comparative Examples 5-10 to 5-18 where graphite (with silicon content) was used as a negative electrode material, the negative electrodes were each formed by mixing 81 mass % of a graphite powder, 9 mass % of a silicon powder, 5 mass % of PVDF as a binder and 5 mass % of acetylene black as a conductive agent, adding NMP to the mixture, applying the resulting paste to a copper foil and drying the applied paste. The charge termination voltage and discharge termination voltage during the evaluation of the batteries were set to the same values as those in Example 1-1. In Examples 5-27 to 5-39 and Comparative Examples 5-19 to 5-27 where hard carbon was used as a negative electrode material, the negative electrodes were each formed by mixing 90 mass % of a hard carbon powder, 5 mass % of PVDF as a binder and 5 mass % of acetylene black as a conductive agent, adding NMP to the mixture, applying the resulting paste to a copper foil and drying the applied paste. During the evaluation of the batteries, the charge termination voltage was set to 4.2 V; and the discharge termination voltage was set to 2.2 V. The evaluation results on the high-temperature storage characteristics and the gas generation amount during the high-temperature storage are shown in TABLES 14 and 15.

In TABLES 14 and 15, the evaluation results (the discharge capacity retention rate and gas generation amount after the storage at 70° C.) are indicated as relative values assuming the evaluation results of Comparative Examples using the comparative electrolytic solution No. 1-1 for the respective electrode configurations as 100.

TABLE 13

|  | (I) | | (II) | | Other Additive | |
|---|---|---|---|---|---|---|
|  | Kind | | Kind | | | |
|  | (Comp. No.) | Mass % | (Comp. No.) | Mass % | Kind | Mass % |
| Elec. Soln. No. 1-5 | No. 1-2 | 0.5 | 1,3-PRS | 1.0 | None | |
| Elec. Soln. No. 2-5 | | | No. 2-1 | 1.0 | | |
| Elec. Soln. No. 3-5 | | | No. 3-1 | 1.0 | | |
| Elec. Soln. No. 4-5 | | | 1,3-PS | 1.0 | | |
| Elec. Soln. No. 1-31 | No. 1-20 | 0.5 | 1,3-PRS | 1.0 | | |
| Elec. Soln. No. 2-32 | | | No. 2-1 | 1.0 | | |
| Elec. Soln. No. 3-32 | | | No. 3-1 | 1.0 | | |
| Elec. Soln. No. 4-31 | | | 1,3-PS | 1.0 | | |
| Elec. Soln. No. 1-17 | No. 1-6 | 0.5 | 1,3-PRS | 1.0 | | |
| Elec. Soln. No. 2-18 | | | No. 2-1 | 1.0 | | |
| Elec. Soln. No. 3-18 | | | No. 3-1 | 1.0 | | |
| Elec. Soln. No. 4-17 | | | 1,3-PS | 1.0 | | |
| Elec. Soln. No. 4-45 | | | 1,3-PS | 0.5 | | |
| | | | 1,2-ES | 0.5 | | |
| Comp. Elec. Soln. No. 1-1 | None | | None | | | |
| Comp. Elec. Soln. No. 1-3 | No. 1-2 | 0.5 | None | | | |
| Comp. Elec. Soln. No. 1-7 | No. 1-20 | 0.5 | None | | | |
| Comp. Elec. Soln. No. 1-4 | No. 1-6 | 0.5 | None | | | |
| Comp. Elec. Soln. No. 1-10 | None | | 1,3-PRS | 1.0 | | |
| Comp. Elec. Soln. No. 2-1 | | | No. 2-1 | 1.0 | | |
| Comp. Elec. Soln. No. 3-1 | | | No. 3-1 | 1.0 | | |
| Comp. Elec. Soln. No. 4-1 | | | 1,3-PS | 1.0 | | |
| Comp. Elec. Soln. No. 4-5 | | | 1,3-PS | 0.5 | | |
| | | | 1,2-ES | 0.5 | | |

TABLE 14

| | Elec. Soln. No. | Positive Electrode Material | Negative Electrode Material | Discharge Capacity Retention Rate After Storage at 70° C. | Gas Generation Amount After Storage at 70° C. |
|---|---|---|---|---|---|
| Ex. 5-1 | Elec. Soln. No. 1-5 | $LiNi_{1/3}Co_{1/3}Mn_{1/3}O_2$ | $Li_4Ti_5O_{12}$ | 132 | 75 |
| Ex. 5-2 | Elec. Soln. No. 2-5 | | | 134 | 77 |
| Ex. 5-3 | Elec. Soln. No. 3-5 | | | 133 | 76 |
| Ex. 5-4 | Elec. Soln. No. 4-5 | | | 131 | 75 |
| Ex. 5-5 | Elec. Soln. No. 1-31 | | | 126 | 82 |
| Ex. 5-6 | Elec. Soln. No. 2-32 | | | 125 | 81 |
| Ex. 5-7 | Elec. Soln. No. 3-32 | | | 126 | 82 |
| Ex. 5-8 | Elec. Soln. No. 4-31 | | | 125 | 83 |
| Ex. 5-9 | Elec. Soln. No. 1-17 | | | 132 | 75 |
| Ex. 5-10 | Elec. Soln. No. 2-18 | | | 132 | 76 |
| Ex. 5-11 | Elec. Soln. No. 3-18 | | | 133 | 75 |
| Ex. 5-12 | Elec. Soln. No. 4-17 | | | 134 | 76 |
| Ex. 5-13 | Elec. Soln. No. 4-45 | | | 133 | 77 |
| Comp. Ex. 5-1 | Comp. Elec. Soln. No. 1-1 | | | 100 | 100 |
| Comp. Ex. 5-2 | Comp. Elec. Soln. No. 1-3 | | | 113 | 88 |
| Comp. Ex. 5-3 | Comp. Elec. Soln. No. 1-7 | | | 114 | 89 |
| Comp. Ex. 5-4 | Comp. Elec. Soln. No. 1-4 | | | 113 | 87 |
| Comp. Ex. 5-5 | Comp. Elec. Soln. No. 1-10 | | | 112 | 105 |
| Comp. Ex. 5-6 | Comp. Elec. Soln. No. 2-1 | | | 113 | 107 |
| Comp. Ex. 5-7 | Comp. Elec. Soln. No. 3-1 | | | 112 | 106 |
| Comp. Ex. 5-8 | Comp. Elec. Soln. No. 4-1 | | | 111 | 104 |
| Comp. Ex. 5-9 | Comp. Elec. Soln. No. 4-5 | | | 112 | 105 |
| Ex. 5-14 | Elec. Soln. No. 1-5 | | Graphite (with Silicon) | 134 | 76 |
| Ex. 5-15 | Elec. Soln. No. 2-5 | | | 131 | 79 |
| Ex. 5-16 | Elec. Soln. No. 3-5 | | | 131 | 78 |
| Ex. 5-17 | Elec. Soln. No. 4-5 | | | 133 | 77 |
| Ex. 5-18 | Elec. Soln. No. 1-31 | | | 129 | 81 |
| Ex. 5-19 | Elec. Soln. No. 2-32 | | | 127 | 79 |
| Ex. 5-20 | Elec. Soln. No. 3-32 | | | 128 | 82 |
| Ex. 5-21 | Elec. Soln. No. 4-31 | | | 128 | 83 |
| Ex. 5-22 | Elec. Soln. No. 1-17 | | | 133 | 77 |
| Ex. 5-23 | Elec. Soln. Na. 2-18 | | | 131 | 79 |
| Ex. 5-24 | Elec. Soln. No. 3-18 | | | 132 | 79 |
| Ex. 5-25 | Elec. Soln. No. 4-17 | | | 133 | 77 |
| Ex. 5-26 | Elec. Soln. No. 4-45 | | | 132 | 78 |

TABLE 14-continued

| Elec. Soln. No. | | Positive Electrode Material | Negative Electrode Material | Discharge Capacity Retention Rate After Storage at 70° C. | Gas Generation Amount After Storage at 70° C. |
|---|---|---|---|---|---|
| Comp. Ex. 5-10 | Comp. Elec. Soln. No. 1-1 | | | 100 | 100 |
| Comp. Ex. 5-11 | Comp. Elec. Soln. No. 1-3 | | | 115 | 89 |
| Comp. Ex. 5-12 | Comp. Elec. Soln. No. 1-7 | | | 116 | 90 |
| Comp. Ex. 5-13 | Comp. Elec. Soln. No. 1-4 | | | 115 | 90 |
| Comp. Ex. 5-14 | Comp. Elec. Soln. No. 1-10 | | | 112 | 103 |
| Comp. Ex. 5-15 | Comp. Elec. Soln. No. 2-1 | | | 111 | 107 |
| Comp. Ex. 5-16 | Comp. Elec. Soln. No. 3-1 | | | 111 | 106 |
| Comp. Ex. 5-17 | Comp. Elec. Soln. No. 4-1 | | | 112 | 104 |
| Comp. Ex. 5-18 | Comp. Elec. Soln. No. 4-5 | | | 113 | 106 |

TABLE 15

| | Elec. Soln. No. | Positive Electrode Material | Negative Electrode Material | Discharge Capacity Retention Rate After Storage at 70° C. | Gas Generation Amount After Storage at 70° C. |
|---|---|---|---|---|---|
| Ex. 5-27 | Elec. Soln. No. 1-5 | $LiNi_{1/3}Co_{1/3}Mn_{1/3}O_2$ | Hard Carbon | 131 | 77 |
| Ex. 5-28 | Elec. Soln. No. 2-5 | | | 129 | 79 |
| Ex. 5-29 | Elec. Soln. No. 3-5 | | | 130 | 78 |
| Ex. 5-30 | Elec. Soln. No. 4-5 | | | 129 | 80 |
| Ex. 5-31 | Elec. Soln. No. 1-31 | | | 124 | 82 |
| Ex. 5-32 | Elec. Soln. No. 2-32 | | | 124 | 81 |
| Ex. 5-33 | Elec. Soln. No. 3-32 | | | 125 | 82 |
| Ex. 5-34 | Elec. Soln. No. 4-31 | | | 124 | 83 |
| Ex. 5-35 | Elec. Soln. No. 1-17 | | | 129 | 76 |
| Ex. 5-36 | Elec. Soln. No. 2-18 | | | 127 | 77 |
| Ex. 5-37 | Elec. Soln. No. 3-18 | | | 127 | 76 |
| Ex. 5-38 | Elec. Soln. No. 4-17 | | | 127 | 78 |
| Ex. 5-39 | Elec. Soln. No. 4-45 | | | 126 | 79 |
| Comp. Ex. 5-19 | Comp. Elec. Soln. No. 1-1 | | | 100 | 100 |
| Comp. Ex. 5-20 | Comp. Elec. Soln. No. 1-3 | | | 111 | 88 |
| Comp. Ex. 5-21 | Comp. Elec. Soln. No. 1-7 | | | 112 | 90 |
| Comp. Ex. 5-22 | Comp. Elec. Soln. No. 1-4 | | | 110 | 87 |
| Comp. Ex. 5-23 | Comp. Elec. Soln. No. 1-10 | | | 112 | 102 |
| Comp. Ex. 5-24 | Comp. Elec. Soln. No. 2-1 | | | 111 | 105 |
| Comp. Ex. 5-25 | Comp. Elec. Soln. No. 3-1 | | | 111 | 104 |
| Comp. Ex. 5-26 | Comp. Elec. Soln. No. 4-1 | | | 110 | 104 |
| Comp. Ex. 5-27 | Comp. Elec. Soln. No. 4-5 | | | 111 | 105 |

Examples 6-1 to 6-52 and Comparative Examples 6-1 to 6-36

Production and Evaluation of Nonaqueous Electrolyte Batteries

Nonaqueous electrolyte batteries of Examples 6-1 to 6-52 and Comparative Examples 6-1 to 6-36 were produced and evaluated in the same manner as in Example 1-1 except for varying positive electrodes, negative electrodes and electrolytic solutions as shown in TABLES 16 and 17. The positive electrodes using $LiCoO_2$ as a positive electrode material were each formed by mixing 85 mass % of a $LiCoO_2$ powder, 10 mass % of PVDF as a binder and 5 mass % of acetylene black as a conductive agent, adding NMP to the mixture, applying the resulting paste to an aluminum foil and drying the applied paste. In Examples 6-1 to 6-13 and Comparative Examples 6-1 to 6-9 where graphite was used as a negative electrode material as in Example 1-1, the charge termination voltage and discharge termination voltage during the evaluation of the batteries were respectively set to 4.2 V and 3.0 V. In Examples 6-14 to 6-26 and Comparative Examples 6-10 to 6-18 where $Li_4Ti_5O_{12}$ was used as a negative electrode material as in Example 5-1, the charge termination voltage and discharge termination voltage during the evaluation of the batteries were respectively set to 2.7 V and 1.5 V. In Examples 6-27 to 6-39 and Comparative Examples 6-19 to 6-27 where graphite (with a silicon content of 9 mass %) was used as a negative electrode material as in Example 5-14, the charge termination voltage and discharge termination voltage during the evaluation of the batteries were respectively set to 4.2 V and 3.0 V. In Examples 6-40 to 6-52 and Comparative Examples 6-28 to 6-36 where hard carbon was used as a negative electrode material as in Example 5-27, the charge termination voltage and discharge termination voltage during the evaluation of the batteries were respectively set to 4.1 V and 2.2 V. The evaluation results on the high-temperature storage characteristics and the gas generation amount during the high-temperature storage are shown in TABLES 16 and 17.

In TABLES 16 and 17, the evaluation results (the discharge capacity retention rate and gas generation amount after the storage at 70° C.) are indicated as relative values assuming the evaluation results of Comparative Examples using the comparative electrolytic solution No. 1-1 for the respective electrode configurations as 100.

TABLE 16

|  | Elec. Soln. No. | Positive Electrode Material | Negative Electrode Material | Discharge Capacity Retention Rate After Storage at 70° C. | Gas Generation Amount After Storage at 70° C. |
|---|---|---|---|---|---|
| Ex. 6-1 | Elec. Soln. No. 1-5 | LiCoO$_2$ | Graphite | 135 | 77 |
| Ex. 6-2 | Elec. Soln. No. 2-5 |  |  | 135 | 78 |
| Ex. 6-3 | Elec. Soln. No. 3-5 |  |  | 134 | 79 |
| Ex. 6-4 | Elec. Soln. No. 4-5 |  |  | 134 | 78 |
| Ex. 6-5 | Elec. Soln. No. 1-31 |  |  | 132 | 81 |
| Ex. 6-6 | Elec. Soln. No. 2-32 |  |  | 131 | 81 |
| Ex. 6-7 | Elec. Soln. No. 3-32 |  |  | 130 | 80 |
| Ex. 6-8 | Elec. Soln. No. 4-31 |  |  | 130 | 82 |
| Ex. 6-9 | Elec. Soln. No. 1-17 |  |  | 130 | 78 |
| Ex. 6-10 | Elec. Soln. No. 2-18 |  |  | 129 | 77 |
| Ex. 6-11 | Elec. Soln. No. 3-13 |  |  | 131 | 78 |
| Ex. 6-12 | Elec. Soln. No. 4-17 |  |  | 130 | 77 |
| Ex. 6-13 | Elec. Soln. No. 4-45 |  |  | 131 | 79 |
| Comp. Ex. 6-1 | Comp. Elec. Soln. No. 1-1 |  |  | 100 | 100 |
| Comp. Ex. 6-2 | Comp. Elec. Soln. No. 1-3 |  |  | 115 | 89 |
| Comp. Ex. 6-3 | Comp. Elec. Soln. No. 1-7 |  |  | 116 | 89 |
| Comp. Ex. 6-4 | Comp. Elec. Soln. No. 1-4 |  |  | 116 | 88 |
| Comp. Ex. 6-5 | Comp. Elec. Soln. No. 1-10 |  |  | 114 | 101 |
| Comp. Ex. 6-6 | Comp. Elec. Soln. No. 2-1 |  |  | 114 | 102 |
| Comp. Ex. 6-7 | Comp. Elec. Soln. No. 3-1 |  |  | 113 | 102 |
| Comp. Ex. 6-8 | Comp. Elec. Soln. No. 4-1 |  |  | 114 | 102 |
| Comp. Ex. 6-9 | Comp. Elec. Soln. No. 4-5 |  |  | 115 | 103 |
| Ex. 6-14 | Elec. Soln. No. 1-5 |  | Li$_4$Ti$_5$O$_{12}$ | 133 | 81 |
| Ex. 6-15 | Elec. Soln. No. 2-5 |  |  | 131 | 80 |
| Ex. 6-16 | Elec. Soln. No. 3-5 |  |  | 131 | 80 |
| Ex. 6-17 | Elec. Soln. No. 4-5 |  |  | 132 | 82 |
| Ex. 6-18 | Elec. Soln. No. 1-31 |  |  | 129 | 81 |
| Ex. 6-19 | Elec. Soln. No. 2-32 |  |  | 129 | 82 |
| Ex. 6-20 | Elec. Soln. No. 3-32 |  |  | 127 | 80 |
| Ex. 6-21 | Elec. Soln. No. 4-31 |  |  | 128 | 81 |
| Ex. 6-22 | Elec. Soln. No. 1-17 |  |  | 127 | 77 |
| Ex. 6-23 | Elec. Soln. No. 2-18 |  |  | 129 | 79 |
| Ex. 6-24 | Elec. Soln. No. 3-18 |  |  | 131 | 78 |
| Ex. 6-25 | Elec. Soln. No. 4-17 |  |  | 132 | 79 |
| Ex. 6-26 | Elec. Soln. No. 4-45 |  |  | 130 | 80 |
| Comp. Ex. 6-10 | Comp. Elec. Soln. No. 1-1 |  |  | 100 | 100 |
| Comp. Ex. 6-11 | Comp. Elec. Soln. No. 1-3 |  |  | 112 | 89 |
| Comp. Ex. 6-12 | Comp. Elec. Soln. No. 1-7 |  |  | 113 | 91 |
| Comp. Ex. 6-13 | Comp. Elec. Soln. No. 1-4 |  |  | 113 | 88 |
| Comp. Ex. 6-14 | Comp. Elec. Soln. No. 1-10 |  |  | 112 | 103 |
| Comp. Ex. 6-15 | Comp. Elec. Soln. No. 2-1 |  |  | 112 | 102 |
| Comp. Ex. 6-16 | Comp. Elec. Soln. No. 3-1 |  |  | 112 | 102 |
| Comp. Ex. 6-17 | Comp. Elec. Soln. No. 4-1 |  |  | 113 | 103 |
| Comp. Ex. 6-18 | Comp. Elec. Soln. No. 4-5 |  |  | 114 | 104 |

TABLE 17

|  | Elec. Soln. No. | Positive Electrode Material | Negative Electrode Material | Discharge Capacity Retention Rate After Storage at 70° C. | Gas Generation Amount After Storage at 70° C. |
|---|---|---|---|---|---|
| Ex. 6-27 | Elec. Soln. No. 1-5 | LiCoO$_2$ | Graphite (with Silicon) | 135 | 77 |
| Ex. 6-28 | Elec. Soln. No. 2-5 |  |  | 133 | 79 |
| Ex. 6-29 | Elec. Soln. No. 3-5 |  |  | 134 | 78 |
| Ex. 6-30 | Elec. Soln. No. 4-5 |  |  | 133 | 77 |
| Ex. 6-31 | Elec. Soln. No. 1-31 |  |  | 132 | 80 |
| Ex. 6-32 | Elec. Soln. No. 2-32 |  |  | 131 | 80 |
| Ex. 6-33 | Elec. Soln. No. 3-32 |  |  | 129 | 79 |
| Ex. 6-34 | Elec. Soln. No. 4-31 |  |  | 128 | 82 |
| Ex. 6-35 | Elec. Soln. No. 1-17 |  |  | 132 | 77 |
| Ex. 6-36 | Elec. Soln. No. 2-18 |  |  | 131 | 80 |
| Ex. 6-37 | Elec. Soln. No. 3-18 |  |  | 131 | 79 |
| Ex. 6-38 | Elec. Soln. No. 4-17 |  |  | 132 | 78 |
| Ex. 6-39 | Elec. Soln. No. 4-45 |  |  | 133 | 79 |
| Comp. Ex. 6-19 | Comp. Elec. Soln. No. 1-1 |  |  | 100 | 100 |
| Comp. Ex. 6-20 | Comp. Elec. Soln. No. 1-3 |  |  | 117 | 88 |
| Comp. Ex. 6-21 | Comp. Elec. Soln. No. 1-7 |  |  | 117 | 89 |
| Comp. Ex. 6-22 | Comp. Elec. Soln. No. 1-4 |  |  | 118 | 87 |
| Comp. Ex. 6-23 | Comp. Elec. Soln. No. 1-10 |  |  | 115 | 105 |
| Comp. Ex. 6-24 | Comp. Elec. Soln. No. 2-1 |  |  | 114 | 107 |
| Comp. Ex. 6-25 | Comp. Elec. Soln. No. 3-1 |  |  | 115 | 107 |

TABLE 17-continued

|  | Elec. Soln. No. | Positive Electrode Material | Negative Electrode Material | Discharge Capacity Retention Rate After Storage at 70° C. | Gas Generation Amount After Storage at 70° C. |
|---|---|---|---|---|---|
| Comp. Ex. 6-26 | Comp. Elec. Soln. No. 4-1 |  |  | 115 | 104 |
| Comp. Ex. 6-27 | Comp. Elec. Soln. No. 4-5 |  |  | 116 | 106 |
| Ex. 6-40 | Elec. Soln. No. 1-5 |  | Hard Carbon | 133 | 78 |
| Ex. 6-41 | Elec. Soln. No. 2-5 |  |  | 132 | 78 |
| Ex. 6-42 | Elec. Soln. No. 3-5 |  |  | 131 | 77 |
| Ex. 6-43 | Elec. Soln. No. 4-5 |  |  | 132 | 79 |
| Ex. 6-44 | Elec. Soln. No. 1-31 |  |  | 127 | 80 |
| Ex. 6-45 | Elec. Soln. No. 2-32 |  |  | 126 | 81 |
| Ex. 6-46 | Elec. Soln. No. 3-32 |  |  | 178 | 8 |
| Ex. 6-47 | Elec. Soln. No. 4-31 |  |  | 127 | 80 |
| Ex. 6-48 | Elec. Soln. No. 1-17 |  |  | 131 | 77 |
| Ex. 6-49 | Elec. Soln. No. 2-18 |  |  | 128 | 80 |
| Ex. 6-50 | Elec. Soln. No. 3-18 |  |  | 129 | 80 |
| Ex. 6-51 | Elec. Soln. No. 4-17 |  |  | 128 | 81 |
| Ex. 6-52 | Elec. Soln. No. 4-45 |  |  | 130 | 78 |
| Comp. Ex. 6-28 | Comp. Elec. Soln. No. 1-1 |  |  | 100 | 100 |
| Comp. Ex. 6-29 | Comp. Elec. Soln. No. 1-3 |  |  | 112 | 89 |
| Comp. Ex. 6-30 | Comp. Elec. Soln. No. 1-7 |  |  | 112 | 91 |
| Comp. Ex. 6-31 | Comp. Elec. Soln. No. 1-4 |  |  | 114 | 88 |
| Comp. Ex. 6-32 | Comp. Elec. Soln. No. 1-10 |  |  | 113 | 104 |
| Comp. Ex. 6-33 | Comp. Elec. Soln. No. 2-1 |  |  | 112 | 103 |
| Comp. Ex. 6-34 | Comp. Elec. Soln. No. 3-1 |  |  | 111 | 103 |
| Comp. Ex. 6-35 | Comp. Elec. Soln. No. 4-1 |  |  | 113 | 104 |
| Comp. Ex. 6-36 | Comp. Elec. Soln. No. 4-5 |  |  | 113 | 106 |

Examples 7-1 to 7-39 and Comparative Examples 7-1 to 7-27

Production and Evaluation of Nonaqueous Electrolyte Batteries

Nonaqueous electrolyte batteries of Examples 7-1 to 7-39 and Comparative Examples 7-1 to 7-27 were produced and evaluated in the same manner as in Example 1-1 except for varying positive electrodes and electrolytic solutions as shown in TABLES 13, 18 and 19. In Examples 7-1 to 7-13 and Comparative Examples 7-1 to 7-9 where $LiNi_{0.8}Co_{0.15}Al_{0.05}O_2$ was used as a positive electrode material, the positive electrodes were each formed by mixing 85 mass % of a $LiNi_{0.8}Co_{0.15}Al_{0.05}O_2$ powder, 10 mass % of PVDF as a binder and 5 mass % of acetylene black as a conductive agent, adding NMP to the mixture, applying the resulting paste to an aluminum foil and drying the applied paste. During the evaluation of the batteries, the charge termination voltage was set to 4.3 V; and the discharge termination voltage was set to 3.0 V. In Examples 7-14 to 7-26 and Comparative Examples 7-10 to 7-18 where $LiMn_2O_4$ was used as a positive electrode material, the positive electrodes were each formed by mixing 85 mass % of a $LiMn_2O_4$ powder, 10 mass % of PVDF as a binder and 5 mass % of acetylene black as a conductive agent, the adding NMP to the mixture, applying the resulting paste to an aluminum foil and drying the applied paste. During the evaluation of the batteries, the charge termination voltage was set to 4.2 V; and the discharge termination voltage was set to 3.0 V. In Examples 7-27 to 7-39 and Comparative Examples 7-19 to 7-27 where $LiFePO_4$ was used as a positive electrode material, the positive electrodes were each formed by mixing 85 mass % of an amorphous carbon-coated $LiFePO_4$ powder, 10 mass % of PVDF as a binder and 5 mass % of acetylene black as a conductive agent, adding NMP to the mixture, applying the resulting paste to an aluminum foil and drying the applied paste. During the evaluation of the batteries, the charge termination voltage was set to 4.2 V; and the discharge termination voltage was set to 2.5 V. The evaluation results on the high-temperature storage characteristics and the gas generation amount during the high-temperature storage are shown in TABLES 18 and 19.

In TABLES 18 and 19, the evaluation results (the discharge capacity retention rate and gas generation amount after the storage at 70° C.) are indicated as relative values assuming the evaluation results of Comparative Examples using the comparative electrolytic solution No. 1-1 for the respective electrode configurations as 100.

TABLE 18

|  | Elec. Soln. No. | Positive Electrode Material | Negative Electrode Material | Discharge Capacity Retention Rate After Storage at 70° C. | Gas Generation Amount After Storage at 70° C. |
|---|---|---|---|---|---|
| Ex. 7-1 | Elec. Soln. No. 1-5 | $LiNi_{0.8}$ $Co_{0.15}$ $Al_{0.05}O_2$ | Graphite | 135 | 75 |
| Ex. 7-2 | Elec. Soln. No. 2-5 |  |  | 135 | 76 |
| Ex. 7-3 | Elec. Soln. No. 3-5 |  |  | 134 | 76 |
| Ex. 7-4 | Elec. Soln. No. 4-5 |  |  | 134 | 75 |
| Ex. 7-5 | Elec. Soln. No. 1-31 |  |  | 131 | 79 |
| Ex. 7-6 | Elec. Soln. No. 2-32 |  |  | 129 | 81 |
| Ex. 7-7 | Elec. Soln. No. 3-32 |  |  | 129 | 80 |
| Ex. 7-8 | Elec. Soln. No. 4-31 |  |  | 130 | 79 |
| Ex. 7-9 | Elec. Soln. No. 1-17 |  |  | 130 | 76 |
| Ex. 7-10 | Elec. Soln. No. 2-18 |  |  | 128 | 77 |
| Ex. 7-11 | Flec. Soln. No. 3-18 |  |  | 130 | 79 |

TABLE 18-continued

|  | Elec. Soln. No. | Positive Electrode Material | Negative Electrode Material | Discharge Capacity Retention Rate After Storage at 70° C. | Gas Generation Amount After Storage at 70° C. |
| --- | --- | --- | --- | --- | --- |
| Ex. 7-12 | Elec. Soln. No. 4-17 |  |  | 129 | 78 |
| Ex. 7-13 | Elec. Soln. No. 4-45 |  |  | 129 | 80 |
| Comp. Ex. 7-1 | Comp. Elec. Soln. No. 1-1 |  |  | 100 | 100 |
| Comp. Ex. 7-2 | Comp. Elec. Soln. No. 1-3 |  |  | 114 | 88 |
| Comp. Ex. 7-3 | Comp. Elec. Soln. No. 1-7 |  |  | 114 | 89 |
| Comp. Ex. 7-4 | Comp. Elec. Soln. No. 1-4 |  |  | 115 | 86 |
| Comp. Ex. 7-5 | Comp. Elec. Soln. No. 1-10 |  |  | 115 | 106 |
| Comp. Ex. 7-6 | Comp. Elec. Soln. No. 2-1 |  |  | 116 | 107 |
| Comp. Ex. 7-7 | Comp. Elec. Soln. No. 3-1 |  |  | 115 | 107 |
| Comp. Ex. 7-8 | Comp. Elec. Soln. No. 4-1 |  |  | 116 | 106 |
| Comp. Ex. 7-9 | Comp. Elec. Soln. No. 4-5 |  |  | 117 | 108 |
| Ex. 7-14 | Elec. Soln. No. 1-5 | $LiMn_2O_4$ |  | 134 | 77 |
| Ex. 7-15 | Elec. Soln. No. 2-5 |  |  | 133 | 78 |
| Ex. 7-16 | Elec. Soln. No. 3-5 |  |  | 133 | 78 |
| Ex. 7-17 | Elec. Soln. No. 4-5 |  |  | 132 | 78 |
| Ex. 7-18 | Elec. Soln. No. 1-31 |  |  | 128 | 80 |
| Ex. 7-19 | Elec. Soln. No. 2-32 |  |  | 126 | 82 |
| Ex. 7-20 | Elec. Soln. No. 3-32 |  |  | 127 | 81 |
| Ex. 7-21 | Elec. Soln. No. 4-31 |  |  | 129 | 79 |
| Ex. 7-22 | Elec. Soln. No. 1-17 |  |  | 129 | 75 |
| Ex. 7-23 | Elec. Soln. No. 2-18 |  |  | 128 | 77 |
| Ex. 7-24 | Elec. Soln. No. 3-18 |  |  | 129 | 79 |
| Ex. 7-25 | Elec. Soln. No. 4-17 |  |  | 129 | 77 |
| Ex. 7-26 | Elec. Soln. No. 4-45 |  |  | 131 | 79 |
| Comp. Ex. 7-10 | Comp. Elec. Soln. No. 1-1 |  |  | 100 | 100 |
| Comp. Ex. 7-11 | Comp. Elec. Soln. No. 1-3 |  |  | 116 | 89 |
| Comp. Ex. 7-12 | Comp. Elec. Soln. No. 1-7 |  |  | 117 | 90 |
| Comp. Ex. 7-13 | Comp. Elec. Soln. No. 1-4 |  |  | 118 | 88 |
| Comp. Ex. 7-14 | Comp. Elec. Soln. No. 1-10 |  |  | 113 | 103 |
| Comp. Ex. 7-15 | Comp. Elec. Soln. No. 2-1 |  |  | 112 | 105 |
| Comp. Ex. 7-16 | Comp. Elec. Soln. No. 3-1 |  |  | 112 | 104 |
| Comp. Ex. 7-17 | Comp. Elec. Soln. No. 4-1 |  |  | 113 | 104 |
| Comp. Ex. 7-18 | Comp. Elec. Soln. No. 4-5 |  |  | 113 | 105 |

TABLE 19

|  | Elec. Soln. No. | Positive Electrode Material | Negative Electrode Material | Discharge Capacity Retention Rate After Storage at 70° C. | Gas Generation Amount After Storage at 70° C. |
| --- | --- | --- | --- | --- | --- |
| Ex. 7-27 | Elec. Soln. No. 1-5 | $LiFePO_4$ | Graphite | 132 | 78 |
| Ex. 7-28 | Elec. Soln. No. 2-5 |  |  | 131 | 79 |
| Ex. 7-29 | Elec. Soln. No. 3-5 |  |  | 130 | 78 |
| Ex. 7-30 | Elec. Soln. No. 4-5 |  |  | 131 | 80 |
| Ex. 7-31 | Elec. Soln. No. 1-31 |  |  | 127 | 80 |
| Ex. 7-32 | Elec. Soln. No. 2-32 |  |  | 125 | 82 |
| Ex. 7-33 | Elec. Soln. No. 3-32 |  |  | 126 | 82 |
| Ex. 7-34 | Elec. Soln. No. 4-31 |  |  | 127 | 80 |
| Ex. 7-35 | Elec. Soln. No. 1-17 |  |  | 127 | 76 |
| Ex. 7-36 | Elec. Soln. No. 2-18 |  |  | 127 | 78 |
| Ex. 7-37 | Elec. Soln. No. 3-18 |  |  | 128 | 77 |
| Ex. 7-38 | Elec. Soln. No. 4-17 |  |  | 129 | 78 |
| Ex. 7-39 | Elec. Soln. No. 4-45 |  |  | 127 | 80 |
| Comp. Ex. 7-19 | Comp. Elec. Soln. No. 1-1 |  |  | 100 | 100 |
| Comp. Ex. 7-20 | Comp. Elec. Soln. No. 1-3 |  |  | 112 | 86 |
| Comp. Ex. 7-21 | Comp. Elec. Soln. No. 1-7 |  |  | 113 | 88 |
| Comp. Ex. 7-22 | Comp. Elec. Soln. No. 1-4 |  |  | 114 | 87 |
| Comp. Ex. 7-23 | Comp. Elec. Soln. No. 1-10 |  |  | 113 | 102 |
| Comp. Ex. 7-24 | Comp. Elec. Soln. No. 2-1 |  |  | 112 | 103 |
| Comp. Ex. 7-25 | Comp. Elec. Soln. No. 3-1 |  |  | 112 | 102 |
| Comp. Ex. 7-26 | Comp. Elec. Soln. No. 4-1 |  |  | 113 | 101 |
| Comp. Ex. 7-27 | Comp. Elec. Soln. No. 4-5 |  |  | 113 | 103 |

As is seen from the above evaluation results, it was possible to improve the high-temperature storage characteristics of the battery and reduce the gas generation amount during the high-temperature storage of the battery by the use of the electrolytic solution for the nonaqueous electrolyte battery according to the present invention, in any of Examples where $Li_4Ti_5O_{12}$, graphite (with silicon) or hard carbon was used as the negative electrode material, as compared to the corresponding comparative examples. It has thus been shown that, regardless of the kind of the negative electrode material, the use of the electrolytic solution for the nonaqueous electrolyte battery according to the present invention provides the nonaqueous electrolyte battery with good high-temperature storage characteristics and reduced gas generation during high-temperature storage.

It was also possible to improve the high-temperature storage characteristics of the battery and reduce the gas generation amount during the high-temperature storage of the battery by the use of the electrolytic solution for the nonaqueous electrolyte battery according to the present invention, in any of Examples where $LiCoO_2$, $LiNi_{0.8}Co_{0.15}Al_{0.05}O_2$, $LiMn_2O_4$ or $LiFePO_4$ was used as the positive electrode material, as compared to the corresponding comparative examples. It has thus been shown that the use of the electrolytic solution for the nonaqueous electrolyte battery according to the present invention provides the nonaqueous electrolyte battery with good high-temperature storage characteristics and reduced gas generation during high-temperature storage regardless of the kind of the positive electrode material.

The invention claimed is:

1. An electrolytic solution for a nonaqueous electrolyte battery, comprising the following components:
   (I) a silane compound;
   (II) a coating film-forming compound;
   (III) a nonaqueous organic solvent; and
   (IV) a solute,
   wherein the component (I) is at least one kind selected from the group consisting of the following compounds No. 1-2, 1-6, 1-7, 1-8, 1-9, 1-16, 1-17, 1-20, 1-21, and 1-22,

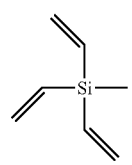

Compound No. 1-2

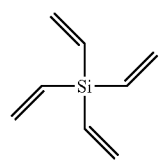

Compound No. 1-6

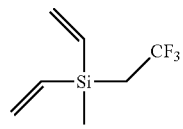

Compound No. 1-7

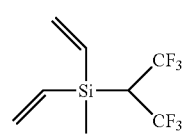

Compound No. 1-8

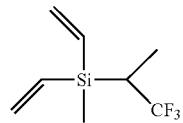

Compound No. 1-9

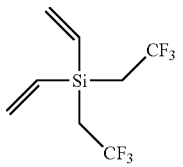

Compound No. 1-16

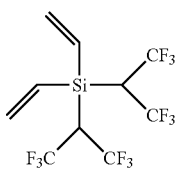

Compound No. 1-17

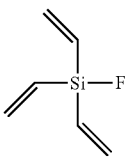

Compound No. 1-20

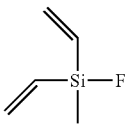

Compound No. 1-21

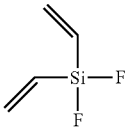

Compound No. 1-22 and wherein the component (II) is at least one kind selected from the group consisting of 1,3-propene sultone, 1,4-butene sultone, 1,3-propane sultone, 1,4-butane sultone, and the following compounds No. 2-1, No. 2-2, No. 2-10, No. 2-15, No. 2-16, No. 3-1, No. 3-2, No. 3-5, and No. 4-1

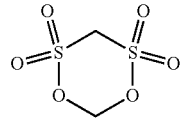

Compound No. 2-1

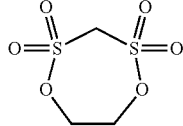

Compound No. 2-2

-continued

Compound No. 2-10
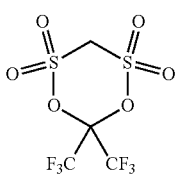

Compound No. 2-15
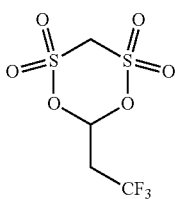

Compound No. 2-16
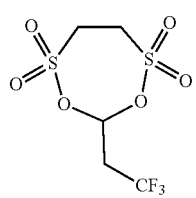

Compound No. 3-1
Compound No. 3-2
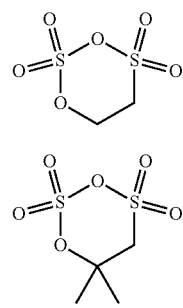

Compound No. 3-5
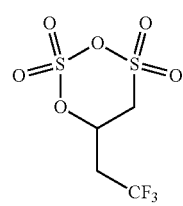

Compound No. 4-I
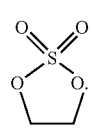

2. The electrolytic solution for the nonaqueous electrolyte battery according to claim 1, wherein the total amount of the component (I) is 0.001 to 10.0 mass % relative to 100 mass % of the total amount of the components (I), (II), (III) and (IV).

3. The electrolytic solution for the nonaqueous electrolyte battery according to claim 1, wherein the total amount of the component (II) is 0.01 to 10.0 mass % relative to 100 mass % of the total amount of the components (I), (II), (III) and (IV).

4. The electrolytic solution for the nonaqueous electrolyte battery according to claim 1, wherein the component (IV) is a solute containing at least one kind selected from the group consisting of lithium hexafluorophosphate, lithium tetrafluoroborate, lithium bis(trifluoromethanesulfonyl)imide, lithium bis(fluorosulfonyl)imide, lithium bis(difluorophosphonyl)imide, lithium (difluorophosphonyl)(fluorosulfonyl)imide and lithium difluorophosphate.

5. The electrolytic solution for the nonaqueous electrolyte battery according to claim 1, wherein the component (III) is a nonaqueous organic solvent containing at least one kind selected from the group consisting of cyclic carbonate, linear carbonate, cyclic ester, linear ester, cyclic ether, linear ether, sulfone compound, sulfoxide compound and ionic liquid.

6. The electrolytic solution for the nonaqueous electrolyte battery according to claim 1, further comprising a fluorine-containing carbonate.

7. The electrolytic solution for the nonaqueous electrolyte battery according to claim 6, wherein the fluorine-containing carbonate is at least one kind selected from the group consisting of fluoroethylene carbonate, 4,4-difluoroethylene carbonate, 4,5-difluoroethylene carbonate and 4,5-difluoro-4,5-dimethylethylene carbonate.

8. The electrolytic solution for the nonaqueous electrolyte battery according to claim 1, further comprising a compound represented by the following general formula (V)

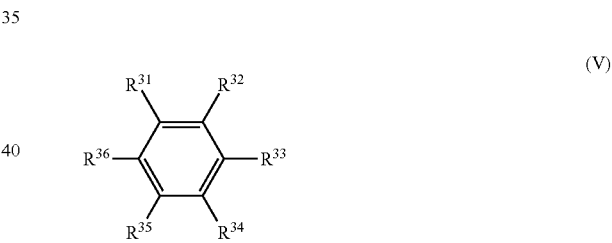

where $R^{31}$ to $R^{36}$ are each independently a hydrogen atom, a $C_1$-$C_{12}$ hydrocarbon group, or a halogen atom; and $R^{31}$ to $R^{36}$ may be bonded together to form a ring.

9. A nonaqueous electrolyte battery, comprising at least a positive electrode, a negative electrode and the electrolytic solution for the nonaqueous electrolyte battery according to claim 1.

* * * * *